(12) United States Patent
Tanzan et al.

(10) Patent No.: US 12,251,974 B2
(45) Date of Patent: Mar. 18, 2025

(54) ROLL VIBRATION DAMPING CONTROL SYSTEM FOR VEHICLE AND TARGET ROLL MOMENT COMPUTING METHOD THEREFOR

(71) Applicant: TOYOTA JIDOSHA KABUSHIKI KAISHA, Toyota (JP)

(72) Inventors: Shota Tanzan, Gotemba (JP); Etsuo Katsuyama, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 18/079,415

(22) Filed: Dec. 12, 2022

(65) Prior Publication Data

US 2023/0116140 A1 Apr. 13, 2023

Related U.S. Application Data

(63) Continuation of application No. 17/549,332, filed on Dec. 13, 2021, now Pat. No. 11,912,091, which is a
(Continued)

(30) Foreign Application Priority Data

Oct. 12, 2018 (JP) ................................ 2018-193880

(51) Int. Cl.
*B60G 17/018* (2006.01)
*B60G 15/06* (2006.01)
(Continued)

(52) U.S. Cl.
CPC ....... *B60G 17/018* (2013.01); *B60G 17/0157* (2013.01); *B60G 17/0164* (2013.01);
(Continued)

(58) Field of Classification Search
None
See application file for complete search history.

(56) References Cited

U.S. PATENT DOCUMENTS

| 5,097,419 A | 3/1992 | Lizell |
| 10,960,723 B1 | 3/2021 | Hall et al. |

(Continued)

FOREIGN PATENT DOCUMENTS

| JP | 2010247631 A | 11/2010 |
| JP | 2016104605 A | 6/2016 |
| JP | 2019135120 A | 8/2019 |

OTHER PUBLICATIONS

A J P. Miège and D Cebon, "Active roll control of an experimental articulated vehicle," Jan. 13, 2005, https://journals.sagepub.com/doi/pdf/10.1243/095440705X28385, p. 791-806 (Year: 2005).*
(Continued)

*Primary Examiner* — Lail A Kleinman
(74) *Attorney, Agent, or Firm* — Dinsmore & Shohl LLP

(57) ABSTRACT

A roll vibration damping control system includes an electronic control unit configured to: compute a sum of a product of a roll moment of inertia and a roll angular acceleration of a vehicle body, a product of a roll damping coefficient and a first-order integral of the roll angular acceleration, and a product of an equivalent roll stiffness of the vehicle and a second-order integral of the roll angular acceleration, as a controlled roll moment to be applied to the vehicle body; compute a roll moment around a center of gravity of a sprung mass as a correction roll moment, the roll moment being generated by lateral force on wheels due to roll motion; and compute a target roll moment based on a value obtained by correcting the controlled roll moment with the correction roll moment.

12 Claims, 16 Drawing Sheets

Related U.S. Application Data continuation of application No. 17/514,462, filed on Oct. 29, 2021, now Pat. No. 11,958,329, which is a continuation of application No. 16/592,097, filed on Oct. 3, 2019, now abandoned.

(51) Int. Cl.

| | | |
|---|---|---|
| *B60G 17/015* | (2006.01) | |
| *B60G 17/016* | (2006.01) | |
| *B60G 17/019* | (2006.01) | |
| *B60G 17/0195* | (2006.01) | |
| *B62D 5/04* | (2006.01) | |

(52) U.S. Cl.
CPC ... *B60G 17/01908* (2013.01); *B60G 17/0195* (2013.01); *B62D 5/0418* (2013.01); *B60G 15/062* (2013.01); *B60G 2202/42* (2013.01); *B60G 2800/916* (2013.01)

(56) References Cited

U.S. PATENT DOCUMENTS

| | | | |
|---|---|---|---|
| 2005/0216154 A1 | 9/2005 | Lehmann et al. | |
| 2012/0046829 A1 | 2/2012 | Ogawa et al. | |
| 2017/0210420 A1 | 7/2017 | Saeger et al. | |
| 2017/0240017 A1* | 8/2017 | Vandersmissen | B60G 17/06 |
| 2019/0031238 A1 | 1/2019 | Kim | |
| 2019/0054916 A1 | 2/2019 | Akiyama et al. | |
| 2019/0241038 A1 | 8/2019 | Katsuyama | |
| 2020/0223274 A1 | 7/2020 | Tucker et al. | |
| 2021/0331546 A1 | 10/2021 | Haskamp et al. | |

OTHER PUBLICATIONS

Smuts, "Tutorials on Filters in Control Systems," Nov. 29, 2016 https://blog.opticontrols.com/archives/1319.*

Gillespie, "Fundamentals of Vehicle Dynamics," Feb. 1, 1992, p. 202.*

Non-Final Office Action issued Mar. 2, 2023 to U.S. Appl. No. 17/549,332, filed Dec. 13, 2021.

Office Action issued Aug. 16, 2022 to U.S. Appl. No. 16/592,097, filed Oct. 3, 2019.

Final Office Action issued to U.S. Appl. No. 16/592,097 on May 11, 2022.

A J P Miege et al, "Active roll control of an experimental articulated vehicle", Proc. IMechE, Jan. 13, 2005, pp. 791-806, vol. 219, https://journals.sagepub.com/doi/pdf/10.1243/095440705X28385, (Year: 2005).

Non-Final US Office Action Issued to U.S. Appl. No. 16/592,097 on Dec. 21, 2021.

Final Office Action Issued to U.S. Appl. No. 16/592,097, dated Mar. 22, 2023.

Final Office Action dated Sep. 7, 2023, Issued to U.S. Appl. No. 17/514,462, filed Oct. 29, 2021.

Final Office Action dated Sep. 11, 2023, Issued to U.S. Appl. No. 17/549,332, filed Dec. 13, 2021.

Non-Final Office Action issued Feb. 16, 2023 to U.S. Appl. No. 17/514,462, filed Oct. 29, 2021.

Dean Karnopp, "On Inverse Equations for Vehicle Dynamics" Jul. 27, 2007, pp. 371-379.

Non-Final Office Action dated Aug. 17, 2023, Issued to U.S. Appl. No. 16/592,097, filed Oct. 3, 2019.

Final Office Action dated Feb. 6, 2024, Issued to U.S. Appl. No. 16/592,097, filed Oct. 3, 2019.

U.S. Appl. No. 17/549,332, filed Dec. 13, 2021, Shota Tanzan et al.
U.S. Appl. No. 17/514,462, filed Oct. 29, 2021, Shota Tanzan et al.
U.S. Appl. No. 16/592,097, filed Oct. 3, 2019, Shota Tanzan et al.

Notice of Allowance dated Dec. 13, 2023, Issued to U.S. Appl. No. 17/514,462, filed Oct. 29, 2021.

Notice of Allowance dated Nov. 1, 2023, Issued to U.S. Appl. No. 17/549,332, filed Dec. 13, 2021.

Non-Final Office Action issued Dec. 21, 2022 to U.S. Appl. No. 16/592,097, filed Oct. 3, 2019.

* cited by examiner

ROLL VIBRATION DAMPING CONTROL SYSTEM FOR VEHICLE AND TARGET ROLL MOMENT COMPUTING METHOD THEREFOR

CROSS-REFERENCE OF RELATED APPLICATIONS

This application is a continuation of U.S. patent application Ser. No. 17/549,332 filed Dec. 23, 2021, which is a continuation of U.S. patent application Ser. No. 17/514,462 filed Oct. 29, 2021, which is a continuation of U.S. patent application Ser. No. 16/592,097 filed Oct. 3, 2019, which claims priority to Japanese Patent Application No. 2018-193880 filed on Oct. 12, 2018, each of which are incorporated herein by reference in their entireties.

BACKGROUND

1. Technical Field

The disclosure relates to a roll vibration damping control system for a vehicle and a target roll moment computing method therefor.

2. Description of Related Art

Vibration damping control systems that damp vibrations with skyhook control are well known as vibration damping control systems for vehicles. In the vibration damping control systems that damp vibrations with skyhook control, a force that acts between a vehicle body and each wheel is controlled by an active suspension or another device based on a single-wheel vehicle model whose sprung mass is hooked in the sky through an imaginary damper. Vibration damping control systems that damp vibrations with negative skyhook control are also known. In the vibration damping control systems, a force that acts between a vehicle body and each wheel is controlled with an active suspension or another device based on a single-wheel vehicle model whose unsprung mass is hooked in the sky through an imaginary damper having a negative damping coefficient. With these vibration damping control systems, vibrations of a vehicle body in a frequency range including the resonant frequency of the vehicle body are reduced in comparison with the case where a force that acts between the vehicle body and each wheel is not controlled.

It is well known that, in damping vibrations with skyhook control, a damping force is generated by controlling braking and driving forces of wheels by using the fact that the braking and driving forces of the wheels are converted by suspensions to up and down forces that act on a vehicle body. One example of vibration damping control systems of this type is described in, for example, Japanese Unexamined Patent Application Publication No. 2016-104605 (JP 2016-104605 A) filed by the applicant of the subject application. With the vibration damping control systems of this type, vibration damping performance in a high-frequency range is improved.

SUMMARY

The above-described vibration damping control systems detect the up and down accelerations of the vehicle body and wheels to obtain the stroke speeds and others of the wheels, required for vibration damping control. However, there is a case in which acceleration sensors that respectively detect the up and down accelerations of the wheels are provided on a position where vibrate upon constantly receiving vibrating force from a road surface, such as the wheels or the like. In the above case, it may be difficult to highly accurately detect the up and down accelerations of the wheels over an extended period of time with the associated acceleration sensors.

In addition, with the vibration damping control systems, vehicle body vibrations in a heave mode and in a pitch mode are damped by damping the up and down vibrations of the vehicle body; however, it is difficult to effectively damp the roll vibrations of the vehicle body. Particularly, as for roll vibrations, the natural frequency and the damping ratio vary depending on vehicle speed, so the roll vibrations of a vehicle may not be effectively damped with vibration damping control based on the single-wheel vehicle model.

The disclosure provides a roll vibration damping control system that is able to effectively control the roll vibrations of a vehicle body, and a target roll moment computing method therefor.

A first aspect of the disclosure provides a roll vibration damping control system for a vehicle. The roll vibration damping control system includes: a roll angular acceleration detector configured to detect a roll angular acceleration of a vehicle body; an actuator configured to generate a roll moment to be applied to the vehicle body; and an electronic control unit configured to store a roll moment of inertia, a roll damping coefficient, and an equivalent roll stiffness of the vehicle, compute a sum of a product of the roll moment of inertia and the roll angular acceleration detected by the roll angular acceleration detector, a product of the roll damping coefficient and a first-order integral of the roll angular acceleration, and a product of the equivalent roll stiffness and a second-order integral of the roll angular acceleration, as a controlled roll moment to be applied to the vehicle body, compute a roll moment around a center of gravity of a sprung mass as a correction roll moment, the roll moment being generated by lateral force on wheels due to roll motion, compute a target roll moment based on a value obtained by correcting the controlled roll moment with the correction roll moment, and control the actuator such that the roll moment that the actuator generates becomes the target roll moment.

According to the above aspect, the sum of the product of the roll moment of inertia and the roll angular acceleration, the product of the roll damping coefficient and the first-order integral of the roll angular acceleration, and the product of the equivalent roll stiffness and the second-order integral of the roll angular acceleration is the controlled roll moment to be applied to the vehicle body to damp the roll vibrations of the sprung mass. However, as will be described in detail later, it turned out that, when the controlled roll moment based on the sum of the three products was applied to the vehicle body, the dynamic characteristics of the roll motion of the vehicle changed. The inventors of the subject application had diligently studied this inconvenience and found that the dynamic characteristics of the roll motion of the vehicle changed under the influence of a roll moment around the center of gravity of a sprung mass due to lateral force on wheels. In addition, the inventors of the subject application found that, when the controlled roll moment was corrected by using the roll moment due to the lateral force on the wheels, the roll vibrations of the vehicle body were effectively damped without any change in the dynamic characteristics of the roll motion of the vehicle.

With the above configuration, the target roll moment is computed based on the value obtained by correcting the controlled roll moment based on the sum of the three products with the correction roll moment, and the actuator is controlled such that the roll moment that the actuator generates becomes the target roll moment. The correction roll moment is a roll moment around the center of gravity of the sprung mass, which is generated by the lateral force on the wheels due to roll motion. Thus, the roll vibrations of the vehicle body are effectively damped without any change in the dynamic characteristics of the roll motion of the vehicle.

In the above aspect, the electronic control unit may be configured to compute the correction roll moment based on a vehicle speed and the roll angular acceleration.

Since the roll moment due to the lateral force on the wheels is the product of the lateral force on the wheels and the height of the center of gravity of the sprung mass, so the roll moment varies as a function of the vehicle speed and the roll angular acceleration as will be described later. According to the above aspect, since the correction roll moment is computed based on the vehicle speed and the roll angular acceleration, the correction roll moment is accurately computed, with the result that the target roll moment is accurately computed.

In the above aspect, the electronic control unit may be configured to apply the same high-pass filter to the roll angular acceleration, the first-order integral, the second-order integral, and the correction roll moment the same number of times at least twice.

With the above configuration, the same high-pass filter is applied to the roll angular acceleration, the first-order integral, the second-order integral, and the correction roll moment the same number of times at least twice. Thus, adverse influence due to an integral offset is removed by the high-pass filter. In comparison with the case where different high-pass filters are respectively applied to the roll angular acceleration and others or the case where the same high-pass filter is applied to the roll angular acceleration and others a different number of times, the possibility of a phase shift of the controlled roll moment or correction roll moment is reduced.

In the above aspect, the electronic control unit may be configured to apply the same low-pass filter to the roll angular acceleration, the first-order integral, the second-order integral, and the correction roll moment.

With the above configuration, the same low-pass filter is applied to the roll angular acceleration, the first-order integral, the second-order integral, and the correction roll moment. The roll angular acceleration and others are processed by removing high-frequency noise so as to be able to accommodate a delay of control of the electronic control unit or actuator. In comparison with the case where different low-pass filters are respectively applied to the roll angular acceleration, the first-order integral, the second-order integral, and the correction roll moment, the possibility of an error or shift in control timing due to high-frequency noise in the controlled roll moment or correction roll moment is reduced.

In the above aspect, the actuator may include active suspensions provided in association with the wheels.

With the above configuration, since the actuator includes the active suspensions provided in association with the wheels, the actuator is able to control a force that acts between the sprung mass and an unsprung mass at the position of each wheel. Thus, the roll vibrations of the sprung mass are damped without adverse influence on the orientation of the vehicle in any of pitch, heave, and warp modes, as will be described later. The roll vibrations of the sprung mass are damped while the orientation of the vehicle in pitch, heave, and warp modes is controlled to a target attitude.

In the above aspect, the actuator may include an active stabilizer provided in association with at least front wheels of the wheels or rear wheels of the wheels.

With the above configuration, since the actuator includes the active stabilizer provided in association with at least the front wheels or the rear wheels, forces that act on the sprung mass in the up and down direction at the positions of the right and left wheels in opposite phases are controlled, so the roll moment for damping roll to be applied to the sprung mass can be controlled.

In the above aspect, the actuator may include in-wheel motors respectively assembled to the wheels.

As will be described in detail later, part of braking and driving forces of the wheels are converted to up and down forces that act on the sprung mass by the suspensions. Thus, the up and down forces that act on the sprung mass can be controlled by controlling the braking and driving forces of the wheels. With the above configuration, since the actuator includes the in-wheel motor assembled to each of the wheels, it is possible to control at least the driving force of each wheel and to control the up and down force that acts on the sprung mass at the position of each wheel. Thus, the roll moment for damping roll to be applied to the sprung mass can be controlled.

In the above aspect, the actuator may include an active steering system provided in association with at least front wheels of the wheels or rear wheels of the wheels.

When the wheels are steered and then a slip angle changes, lateral force on the wheels changes, so the roll moment around the center of gravity of the sprung mass, which is generated by the lateral force on the wheels, changes. Thus, when the slip angle is changed by the steering of the wheels such that the roll moment due to lateral force on the wheels acts as a roll moment for damping roll, the roll vibrations of the sprung mass are damped. With the above configuration, the actuator includes an active steering system provided in association with at least the front wheels or the rear wheels. Thus, at least the front wheels or the rear wheels can be steered such that the roll moment due to lateral force on at least the front wheels or the rear wheels acts as a roll moment for damping roll.

A second aspect of the disclosure relates to a target roll moment computing method for a roll vibration damping control system for a vehicle. The roll vibration damping control system includes a roll angular acceleration detector configured to detect a roll angular acceleration of a vehicle body, an actuator configured to generate a roll moment to be applied to the vehicle body, and an electronic control unit configured to control the actuator such that the roll moment becomes a target roll moment. The target roll moment computing method includes storing, by the electronic control unit, a roll moment of inertia, roll damping coefficient, and equivalent roll stiffness of the vehicle, computing, by the electronic control unit, a sum of a product of the roll moment of inertia and the roll angular acceleration detected by the roll angular acceleration detector, a product of the roll damping coefficient and a first-order integral of the roll angular acceleration, and a product of the equivalent roll stiffness and a second-order integral of the roll angular acceleration, as a controlled roll moment to be applied to the vehicle body, computing, by the electronic control unit, a roll moment around a center of gravity of a sprung mass as a correction roll moment, the roll moment being generated by lateral force on wheels due to roll motion, and computing, by the electronic control unit, the target roll moment based on a value obtained by correcting the controlled roll moment with the correction roll moment.

In the second aspect, the correction roll moment may be computed by the electronic control unit based on a vehicle speed and the roll angular acceleration.

In the second aspect, the same high-pass filter may be applied by the electronic control unit to the roll angular acceleration, the first-order integral, the second-order integral, and the correction roll moment the same number of times at least twice.

In the second aspect, the same low-pass filter may be applied by the electronic control unit to the roll angular acceleration, the first-order integral, the second-order integral, and the correction roll moment.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Principles Adopted in Embodiments

For the sake of easy understanding of the disclosure, up and down vibration damping control concerned with embodiments of the disclosure will be described with reference to FIG. 16 in advance of the description of the embodiments.

Up and Down Vibration Damping Control Vehicle Model

Figure 16:
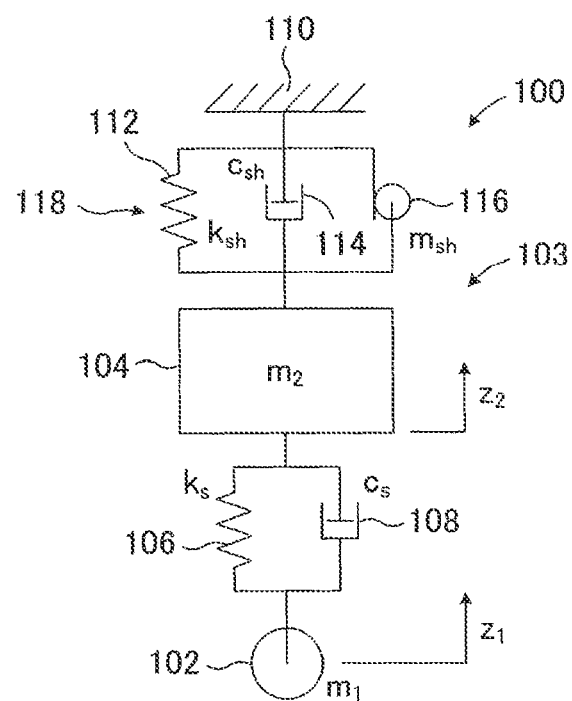
FIG. 16 is a view that shows a single-wheel vehicle model that is used in vibration damping control that is executed by a vibration damping control system related to the vibration damping control system of the embodiments of the disclosure.

FIG. 16 shows a single-wheel vehicle model 100 that is used in up and down vibration damping control concerned with vibration damping control systems according to the embodiments of the disclosure. In FIG. 16, reference numerals 102, 104 respectively denote an unsprung mass and sprung mass of a vehicle 103. A spring 106 and damper 108 of a conventional suspension are provided between the unsprung mass 102 and the sprung mass 104. A skyhook device 118 is provided between the sprung mass 104 and an imaginary support 110 above the sprung mass 104. The skyhook device 118 includes a spring 112, damper 114, and inerter 116, hooked in the sky. The sprung mass 104 is hooked in the sky by the skyhook device 118.

Computation of Target Controlling Force

As shown in FIG. 16, let the mass of the unsprung mass 102 and the mass of the sprung mass 104 be $m_1$ and $m_2$, respectively, and let the up and down displacements of the unsprung mass 102 and sprung mass 104 be $z_1$ and $z_2$, respectively. Let the spring constant of the spring 106 be $k_s$, and let the damping coefficient of the damper 108 be $c_s$. Let the spring constant of the spring 112 be $k_{sh}$, let the damping coefficient of the damper 114 be $c_{sh}$, and let the equivalent mass of the inerter 116 be $m_{sh}$.

Where Laplace operator is s, the equation of motion of the sprung mass 104 in an up and down direction is expressed by the following equation (1), and a controlling force Fc(s) that the skyhook device 118 applies to the sprung mass 104 is expressed by the following equation (2). It is clear from the following equation (2) that the controlling force Fc(s) is composed of only the terms proportional to the up and down displacement $z_2$ of the sprung mass 104, the controlling force Fc(s) that is applied to the sprung mass 104, that is, a target damping force, can be computed based on only the displacement $z_2$ of the sprung mass 104.

$$M_2 Z_2 S^2 = (C_s S + k_s)(z_1 - z_2) + Fc(s) \quad (1)$$

$$Fc(s) = -(m_{sh} s^2 + C_{sh} S + k_{sh}) Z_2 \quad (2)$$

When dm, dc, and dk are respectively defined by the following equations (3), (4), (5) where e is a constant value, the equation (2) can be rewritten to the following equation (6). It is clear from the equation (1) and the following equation (6) that, although only the up and down displacement $z_2$ of the sprung mass 104 is required to compute the target damping force Fc(s), the relation of the up and down displacement $z_2$ of the sprung mass 104 with respect to the up and down displacement $z_1$ of the unsprung mass 102 can be obtained.

$$dm = \frac{m_{sh} - em_2}{(1+e)m_2} \quad (3)$$

$$dc = \frac{c_{sh} - ec_s}{(1+e)c_s} \quad (4)$$

$$dk = \frac{k_{sh} - ek_s}{(1+e)k_s} \quad (5)$$

$$Fc(s) = -e(m_2s^2 + c_s s + k_s)z_2 - (1+e)(dmm_2s^2 + dcc_s s + dkk_s)z_2 \quad (6)$$

When the equation (6) is substituted into the equation (1) and then the obtained equation is solved for the up and down displacement $z_2$ of the sprung mass 104, the up and down displacement $z_2$ of the sprung mass 104 is expressed by the following equation (7).

$$z_2 = \frac{\frac{c_s s + k_s}{1+e}z_1}{(1+dm)m_2 s^2 + (1+dc)c_s s + (1+dk)k_s} \quad (7)$$

As is known, the up and down displacement $z_2$ of the sprung mass 104 without control is expressed by the following equation (8).

$$z_2 = \frac{c_s s + k_s}{m_2 s^2 + c_s s + k_s} z_1 \quad (8)$$

When a comparison is made between the equation (7) and the equation (8), it is clear that, with the skyhook device 118 shown in FIG. 16, the numerator of the equation (8), that is, the coefficients of the up and down displacement $z_1$, are reduced. Particularly, since the numerator is multiplied by 1/(1+e), the up and down displacement $z_2$ of the sprung mass 104 is reduced when e is a positive constant value as compared to, for example, when e is zero or a negative value. That is, the amplitude of vibrations of the sprung mass 104 due to a disturbance input from a road surface is reduced, with the result that the ride quality of the vehicle is improved in a wide frequency range.

The values dm, dc, dk included in the denominator of the equation (7) are values that respectively change the inherent characteristics on the inertial force, damping force, and spring force of the suspension. As described above, dm, dc, and dk are respectively expressed by the equations (3), (4), (5). Thus, the equivalent mass $m_{sh}$ of the inerter 116, the damping coefficient $c_{sh}$ of the damper 114, and the spring constant $k_{sh}$ of the spring 112 just need to be set such that the inherent characteristics become desired characteristics.

To reduce the vibrations of the sprung mass 104 without changing the inherent characteristics as compared to cases based on the existing general skyhook theory, the equivalent mass $m_{sh}$, the damping coefficient $c_{sh}$, and the spring constant $k_{sh}$ just need to be set such that dm, dc, and dk all are zero. That is, the equivalent mass $m_{sh}$, the damping coefficient $c_{sh}$, and the spring constant $k_{sh}$ just need to be set to values that respectively satisfy the following equations (9), (10), (11). In that case, the second term of the equation (6) is zero, so the target damping force Fc(s) is expressed by the following equation (12).

$$m_{sh} = em_2 \quad (9)$$

$$c_{sh} = ec_s \quad (10)$$

$$k_{sh} = ek_s \quad (11)$$

$$Fc(s) = -e(m_2 s^2 \pm C_s S + k_s)Z_2 \quad (12)$$

To damp the up and down vibrations of a sprung mass based on the above idea, the up and down displacement of the sprung mass needs to be learned. However, it is not easy to obtain the absolute up and down displacement of a sprung mass, so it is conceivable that the up and down acceleration of a sprung mass is detected and then the first-order integral and second-order integral of the up and down acceleration are respectively computed as the up and down velocity and up and down displacement of the sprung mass.

When the first-order integral and second-order integral of the detected up and down acceleration of a sprung mass are respectively computed as the up and down velocity and up and down displacement of the sprung mass, a high-pass filter for removing an integral offset is required. An actual vibration damping system has a delay, and the delay can be expressed by a low-pass filter. Thus, a transfer function corresponding to the product of the high-pass filter and the low-pass filter is multiplied by each of the up and down acceleration, up and down velocity, and up and down displacement of the sprung mass.

Where the transfer functions that are respectively multiplied by the up and down acceleration, the up and down velocity, and the up and down displacement are respectively $D_2(s)$, $D_1(s)$, and $D_0(s)$, the target damping force Fc(s) is expressed by the following equation (13) that corresponds to the equation (12).

$$Fc(s) = -e(m_2 D_2(s) s^2 + c_s D_1(s) s + k_s D_0(s))z_2 \quad (13)$$

When the equation (13) is substituted into the equation (1) and then the obtained equation is solved for the up and down displacement $z_2$ of the sprung mass 104, the up and down displacement $z_2$ of the sprung mass 104 is expressed by the following equation (14).

$$z_2 = \frac{c_s s + k_s}{(1 + eD_2(s))m_2 s^2 + (1 + eD_1(s))c_s s + (1 + D_0(s))k_s} z_1 \quad (14)$$

When the same high-pass filter and the same low-pass filter are applied to the up and down acceleration, up and down velocity, and up and down displacement of the sprung mass 104 such that the transfer functions $D_2(s)$, $D_1(s)$, $D_0(s)$ satisfy the following equation (15), the equation (14) can be rewritten to the following equation (16). The high-pass filter need not be applied to the up and down displacement; however, the high-pass filter needs to be applied to the up and down acceleration at least twice. Thus, the high-pass filter is applied to the up and down acceleration and also to the up and down velocity at least twice.

$$D_2(s) = D_1(s) = D_0(s) \equiv D(s) \quad (15)$$

$$z_2 = \frac{c_s s + k_s}{(1 + eD(s))(m_2 s^2 + c_s s + k_s)} z_1$$
$$= \frac{\frac{c_s s + k_s}{1 + eD(s)}}{m_2 s^2 + c_s s + k_s} z_1 \quad (16)$$

It is clear from the equations (8), (16) that, when the same high-pass filter and the same low-pass filter are applied to the up and down acceleration, up and down velocity, and up and down displacement of the sprung mass 104, the numerator is reduced while the denominator remains as the case with the existing general skyhook control. That is, it is clear that, since the up and down displacement $z_2$ of the sprung mass 104 is reduced without changing the denominator, the amplitude of the up and down vibrations of the sprung mass 104 due to a disturbance input from a road surface is reduced.

A vibration damping control system for up and down vibrations based on the above idea is described in the specification and drawings of Japanese Patent Application No. 2018-018371 filed by the applicant of the subject application.

Roll Vibration Damping Control

Damping of roll vibrations by the application of the idea of the up and down vibration damping control to roll vibration damping control will be discussed.

Vehicle Model

Figure 17:
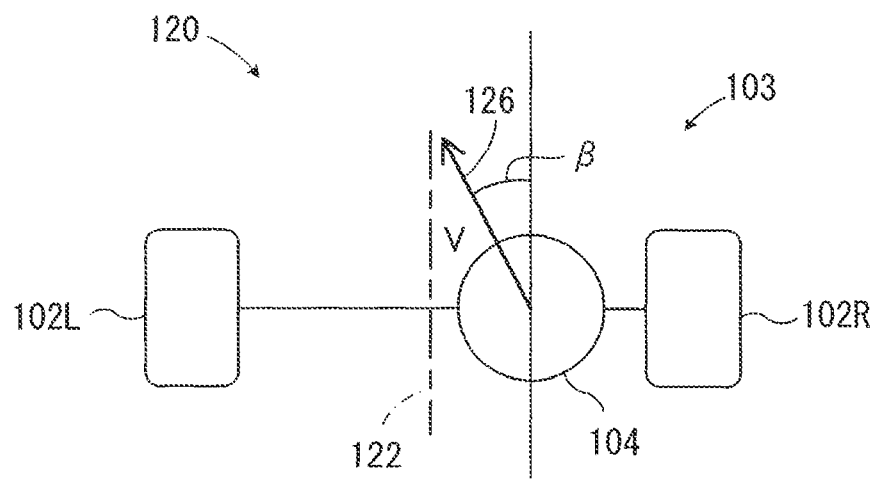
FIG. 17 is a top view of a two-wheel vehicle model that is used in roll vibration damping control that is executed by the vibration damping control systems of the embodiments of the disclosure.
Figure 18:
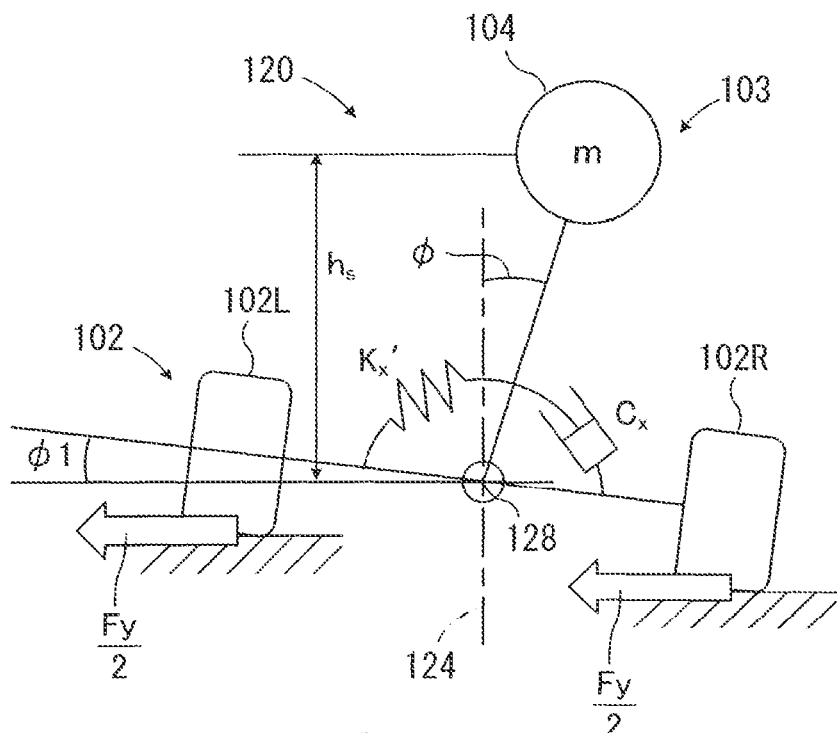
FIG. 18 is a rear view of the two-wheel vehicle model that is used in roll vibration damping control that is executed by the vibration damping control systems of the embodiments of the disclosure.

FIG. 17 shows a top view of a two-wheel vehicle model 120 that is used in roll vibration damping control concerned with the vibration damping control systems according to the embodiments of the disclosure. FIG. 18 shows a rear view of the two-wheel vehicle model 120. In FIG. 17 and FIG. 18, reference numerals 102R, 102L respectively denote right and left wheels of the vehicle 103, reference numerals 122, 124 respectively denote a center line, extending in a front and rear direction, of the vehicle 103, and a center line, extending in a vertical direction, of the vehicle 103. Let an angle that a travel direction 126 of the vehicle makes with the front and rear direction of the vehicle 103, that is, a slip angle of the vehicle, be $\beta$. Let a roll angle around a roll center 128 of the sprung mass 104 be $\phi$, and let a roll angle of the unsprung mass 102 be $\phi_1$. Let the roll damping coefficient of the vehicle 103 be $C_x$, and let the equivalent roll stiffness be by $K_x'$. Let the mass of the sprung mass 104 be m, and let the difference in level between the roll center 128 of the sprung mass 104 and the center of gravity of the sprung mass 104 (hereinafter, referred to as roll arm length) be $h_s$.

Computation of Controlled Roll Moment $M_{xc}$

Let a vehicle speed be V, let a lateral force on the vehicle 103 at the time of turn of the vehicle 103 accompanied by rolling of the sprung mass 104 be $F_y$, and let a lateral force on the tire of each of the wheels 102R, 102L be $F_y/2$. The roll motion of the vehicle 103 is coupled with the planar motion of the vehicle 103 in a transverse direction through the lateral force that acts on each tire. The equation of motion in the transverse direction of the vehicle 103 and the equation of motion around the center of gravity of the sprung mass 104 are respectively expressed by the following equations (17), (18).

$$mV\beta s = F_y \quad (17)$$

$$I_x s^2 \phi = -(C_x s + K_x)(\phi - \phi_1) + mgh_s \phi + M_{xFy} + M_{xc} \quad (18)$$

In the equations (17), (18), s is a Laplace operator. In the equation (18), g is a gravitational acceleration, and $I_x$ is a roll moment of inertia of the vehicle. $M_{xc}$ is a controlled roll moment to be applied to the vehicle 103 through roll vibration damping control. $M_{xFy}$ is a roll moment $h_s F_y$ that is generated by the lateral force $F_y$ that acts on the vehicle 103. The lateral force $F_y$ is the sum of lateral forces on all the wheels. Where a normalized equivalent cornering power of the wheels is C and the slip angle of the vehicle 103 is $\beta$, the lateral force $F_y$ is expressed by the following equation (19).

$$F_y = Cmg\left(-\beta - \frac{h_s}{V}\phi s\right) \quad (19)$$

In application of the idea of the up and down vibration damping control to roll vibration damping control, the target damping force Fc(s) in the equation (12) is replaced by the controlled roll moment $M_{xc}(s)$, and the mass $m_2$ of the sprung mass 104 is replaced by the roll moment of inertia $I_x$ of the vehicle 103. The damping coefficient $c_s$ of the damper 108 is replaced by the roll damping coefficient $C_x$, and the spring constant $k_s$ of the spring 106 is replaced by the equivalent roll stiffness $K_x'$. The control gain e is replaced by a control gain a (positive constant). The controlled roll moment $M_{xc}(s)$ is expressed by the following equation (20) that corresponds to the equation (12). The equivalent roll stiffness $K_x'$ is represented by the sum of the mechanical roll stiffness of the vehicle 103 and a roll moment $-mgh_s$ proportional to the roll angle $\phi$ of the sprung mass 104.

$$M_{xc} = -\alpha(I_x s^2 + C_x s + K_x')\phi \quad (20)$$

From the equations (17), (18), (19), (20), a transfer function from the roll angle $\phi_1$ of the unsprung mass 102 to the roll angle $\phi$ of the sprung mass 104 is expressed by the following equation (21).

$$\frac{\varphi}{\varphi_1} = \frac{(Cg + Vs)(C_x s + K_x)}{(1+\alpha)(I_x s^2 + C_x s + K_x')(Cg + Vs) + Cmgh_2^2 s^2} \quad (21)$$

The denominator in the equation (21) is composed of a first term and a second term, but the coefficient (1+a) is multiplied by only the first term of the denominator. As is apparent from comparison with the equation (16) in the up and down vibration damping control, if the coefficient (1+a) is not multiplied by the second term of the denominator, the roll angle $\phi$ of the sprung mass 104 is not reduced with respect to the roll angle $\phi_1$ of the unsprung mass 102. That is, the amplitude of roll vibrations of the sprung mass 104 due to a disturbance input from a road surface is not effectively reduced.

From the equations (18), (20), the roll angle $\phi$ of the sprung mass 104 is expressed by the following equation (22). On the right-hand side of the equation (22), the coefficient $1/(1+\alpha)$ is multiplied by not only the first term but also the second term. When the slip angle $\beta$ of the vehicle 103 is eliminated from the equations (17), (19), the roll moment $M_{xFy}$ that is generated by the lateral force $F_y$ on the vehicle 103 is expressed by the following equation (23). It is clear from the following equation (23) that generation of the roll moment $M_{xFy}$ is due to the roll angular acceleration $\phi s^2$ of the sprung mass 104. Thus, according to the following equation (22) in which the coefficient $1/(1+a)$ is multiplied by the second term containing the roll moment $M_{xFy}$, the dynamic characteristics of roll motion of the vehicle 103 presumably change.

$$\varphi = \left(\frac{1}{1+\alpha}\right)\frac{(C_x s + K_x)}{(I_x s^2 + C_x s + K'_x)}\varphi_1 + \left(\frac{1}{1+\alpha}\right)\frac{1}{(I_x s^2 + C_x s + K'_x)}M_{xFy} \quad (22)$$

$$M_{xFy} = h_s F_y = -\frac{Cmgh_s^2}{Cg + Vs}\varphi s^2 = -\frac{mh_s^2}{1 + \frac{V}{Cg}s}\varphi s^2 \quad (23)$$

As is apparent from the equation (23), the roll moment $M_{xFy}$ is a value obtained by processing the product $mh_s\varphi s^2$ of the mass m of the sprung mass 104, the square of the roll arm length $h_s$, and the roll angular acceleration $\varphi s^2$ of the sprung mass 104 with a first-order lag filter. A time constant of the first-order lag filter is a value obtained by dividing the vehicle speed V by the product Cg of the normalized cornering power C of the wheels and the gravitational acceleration g.

To suitably damp the roll vibrations of the sprung mass 104 as in the case of damping of up and down vibrations with the up and down vibration damping control, the roll vibrations need to be controlled without changing the dynamic characteristics of the roll motion of the vehicle 103. Thus, by making compensation such that the coefficient $1/(1+a)$ is not multiplied by the second term of the equation (22), the roll vibrations of the sprung mass 104 can be suitably damped as in the case of damping of up and down vibrations with the up and down vibration damping control. The compensation is achieved by employing a value obtained by adding $\alpha M_{xFy}$ to the right-hand side of the equation (20) corresponding to the up and down vibration damping control as the controlled roll moment $M_{xc}(s)$ as shown in the equation (24).

$$M_{xc}(s) = -\alpha((I_x s^2 + c_x s + K_x')\varphi - M_{xFy}) \quad (24)$$

From the equations (17), (18), (19), (24), the transfer function from the roll angle $\varphi_1$ of the unsprung mass 102 to the roll angle $\varphi$ of the sprung mass 104 is expressed by the following equation (25). In addition, the equation (22) changes into the following equation (26). Thus, when the controlled roll moment $M_{xc}(s)$ is set to a value that is computed by using the equation (24), roll vibrations are damped without changing the dynamic characteristics of roll motion of the vehicle 103.

$$\frac{\varphi}{\varphi_1} = \left(\frac{1}{1+\alpha}\right)\frac{(Cg + Vs)(C_x s + K_x)}{(I_x s^2 + C_x s + K'_x)(Cg + Vs) + Cmgh_s^2 s^2} \quad (25)$$

$$\varphi = \left(\frac{1}{1+\alpha}\right)\frac{(C_x s + K_x)}{(I_x s^2 + C_x s + K'_x)}\varphi_1 + \frac{1}{(I_x s^2 + C_x s + K'_x)}M_{xFy} \quad (26)$$

As in the case of respectively computing the first-order integral and second-order integral of the up and down acceleration as the up and down velocity and up and down displacement of the sprung mass 104 in the up and down vibration damping control, it is conceivable that the first-order integral and second-order integral of the roll angular acceleration $\varphi s^2$ are respectively computed as the roll angular velocity $\varphi s$ and the roll angle $\varphi$.

When the first-order integral and second-order integral of the roll angular acceleration are respectively computed as the roll angular velocity and roll angle of the sprung mass 104, a high-pass filter for removing an integral offset is required. An actual vibration damping system has a delay, and the delay can be expressed by a low-pass filter. Thus, a transfer function corresponding to the product of the high-pass filter and the low-pass filter is multiplied by each of the roll angular acceleration, roll angular velocity, and roll angle.

Where the transfer functions that are respectively multiplied by the roll angular acceleration, the roll angular velocity, and the roll angle are respectively $D_{r2}(s)$, $D_{r1}(s)$, and $D_{r0}(s)$, the controlled roll moment $M_{xc}(s)$ is expressed by the following equation (27) that corresponds to the equation (24). Thus, the controlled roll moment $M_{xc}(s)$ can be obtained without the need for information on the roll angle $\varphi_1$ of the unsprung mass 102.

$$Mxc(s) = -\alpha\left(\left(I_x + \frac{mh_s^2}{1 + \frac{V}{Cg}s}\right)s^2 D_{r2}(s) + C_s s D_{r1}(s) + K'_x D_{r0}(s)\right)\varphi \quad (27)$$

When the same high-pass filter and the same low-pass filter are applied to the roll angular acceleration, the roll angular velocity, and the roll angle such that the transfer functions $D_{r2}(s)$, $D_{r1}(s)$, $D_{r0}(s)$ satisfy the following equation (28), the equation (25) can be rewritten to the following equation (29). The high-pass filter need not be applied to the roll angle; however, the high-pass filter needs to be applied to the roll angular acceleration at least twice. Thus, the high-pass filter is applied to the roll angular acceleration and also to the roll angular velocity at least twice.

$$D_{r2}(s) = D_{r1}(s) = D_{r0}(s) \equiv D(s) \quad (28)$$

$$\frac{\varphi}{\varphi_1} = \left(\frac{1}{1+\alpha D(s)}\right)\frac{(Cg + Vs)(C_x s + K_x)}{(I_x s^2 + C_x s + K'_x)(Cg + Vs) + Cmgh_s^2 s^2} \quad (29)$$

It is clear from the equation (29) that, when the same high-pass filter and the same low-pass filter are applied to the roll angular acceleration, the roll angular velocity, and the roll angle, roll vibrations are damped without changing the characteristic equation of the denominator.

Procedure of Computing Roll Moment $M_{xFy}$

Next, a procedure to compute the roll moment $M_{xFy}$ that is generated by the lateral force $F_y$ on the vehicle 103 will be described.

Computation Procedure 1

The roll moment $M_{xFy}$ is expressed by the equation (23). Thus, the roll moment $M_{xFy}$ is computed by using the function of the equation (23) based on the vehicle speed V and the roll angular acceleration $\varphi s^2$ of the sprung mass 104.

Computation Procedure 2

Figure 19:
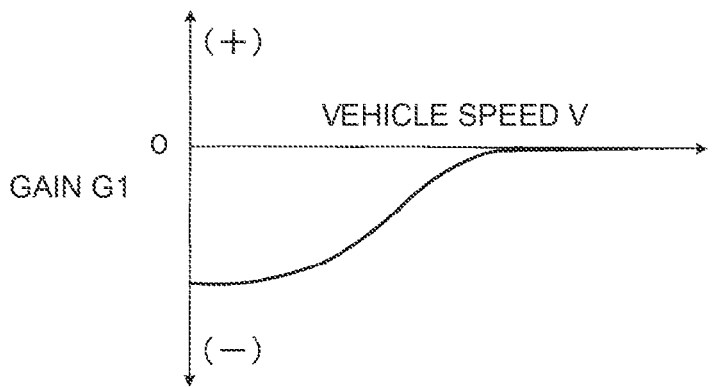
FIG. 19 is a map for computing a gain, to be multiplied by the roll angular acceleration of a vehicle body, based on a vehicle speed.
Figure 20:
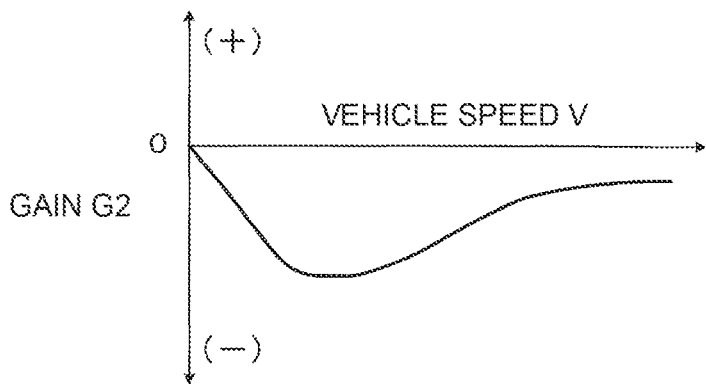
FIG. 20 is a map for computing a gain, to be multiplied by the roll angular velocity of the vehicle body, based on a vehicle speed.

As described above, the roll moment $M_{xFy}$ is a value obtained by processing the product $mh_s\varphi s^2$ of the mass m of the sprung mass 104, the square of the roll arm length $h_s$, and the roll angular acceleration $\varphi s^2$ of the sprung mass 104 with the first-order lag filter. Thus, for example, the gain G1 is computed based on the vehicle speed V by using the map or function shown in FIG. 19, and the gain G2 is computed based on the vehicle speed V by using the map or function shown in FIG. 20. In addition, the roll moment $M_{xFy}$ is computed as the sum of the product of the gain G1 and the roll angular acceleration $\varphi s^2$ of the sprung mass 104 and the product of the gain G2 and the roll angular velocity $\varphi s$ in accordance with the following equation (30).

$$M_{xFy} = G1\varphi s^2 + G2\varphi s \quad (30)$$

Computation Procedure 3

The gain of the first-order lag filter that is expressed in the equation (23) varies depending on the frequency of the roll angular acceleration $\phi s^2$ of the sprung mass 104 and the frequency of the roll angular velocity $\phi s$. Thus, the frequency of the roll angular acceleration $\phi s^2$ and the frequency of the roll angular velocity $\phi s$ are computed, a gain G3 is computed based on the frequency of the roll angular acceleration $\phi s^2$ by using a map or function not shown in the drawing, and a gain G4 is computed based on the frequency of the roll angular velocity $\phi s$ by using a map or function not shown in the drawing. In addition, the roll moment $M_{xFy}$ is computed as the sum of the product of the gain g3 and the roll angular acceleration $\phi s^2$ and the product of the gain G4 and the roll angular velocity $\phi s$ in accordance with the following equation (31).

$$M_{xFy} = G3\phi s^2 + G4\phi s \tag{31}$$

Computation Procedure 4

As a modification of the computation procedure 2 or the computation procedure 3, a gain G5 is computed from the roll angular acceleration and the vehicle speed by using a map or function, and a gain G6 is computed from the roll angular velocity and the vehicle speed by using another map or function. The roll moment $M_{xFy}$ is computed as the sum of the product of the gain G5 and the roll angular acceleration $\phi s^2$ of the sprung mass 104 and the product of the gain G6 and the roll angular velocity $\phi s$ in accordance with the following equation (32).

$$M_{xFy} = G5\phi s^2 + G6\phi s \tag{32}$$

EMBODIMENTS

Hereinafter, embodiments of the disclosure will be described with reference to the accompanying drawings.

First Embodiment

Figure 1:
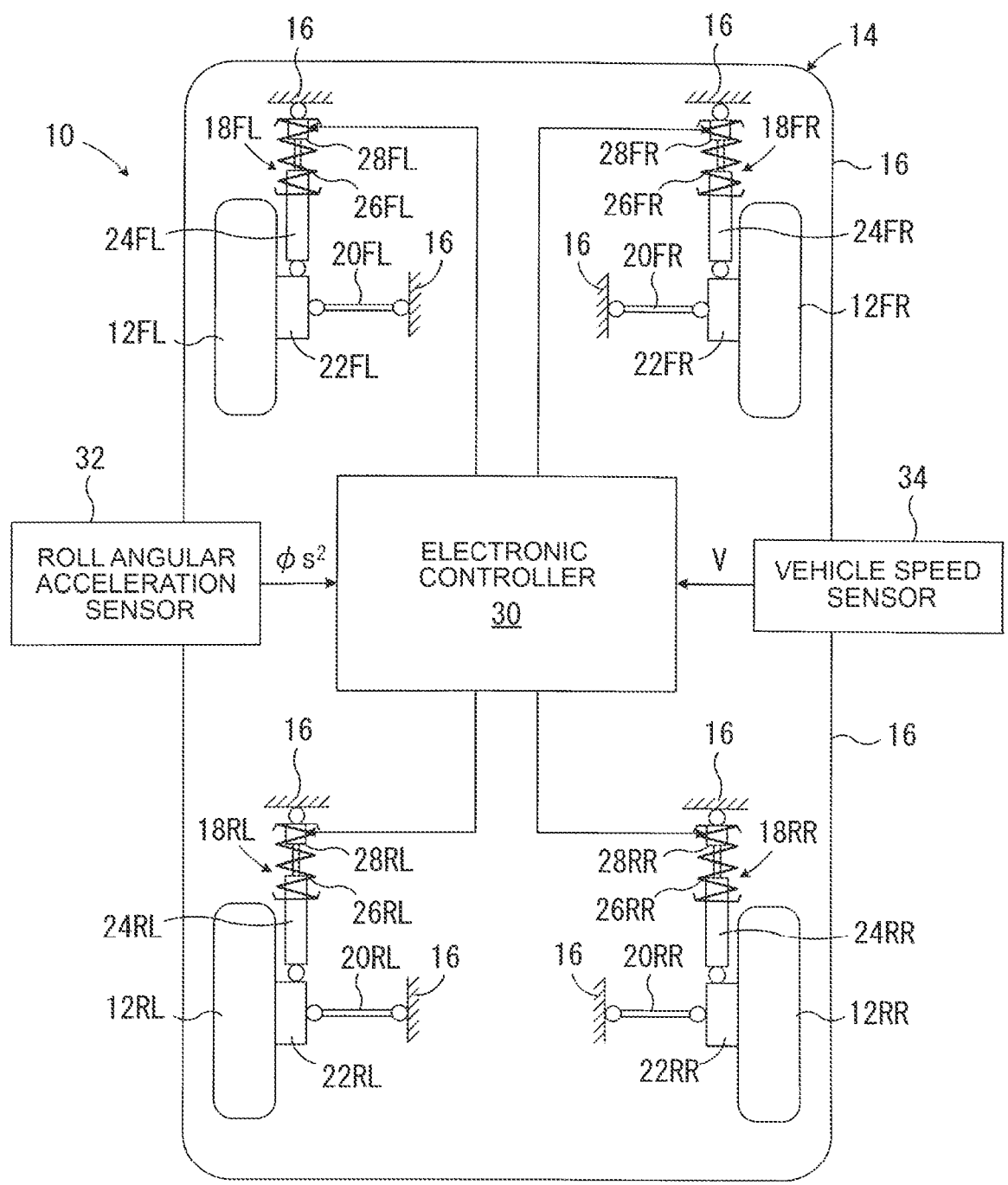
FIG. 1 is a schematic configuration diagram that shows a roll vibration damping control system according to a first embodiment of the disclosure, which is applied to a vehicle in which active suspensions are provided in association with wheels.

As shown in FIG. 1, a roll vibration damping control system 10 of the first embodiment is applied to a vehicle 14 in which active suspensions that function as actuators that generate a roll moment to be applied to a vehicle body 16 are provided in association with wheels. The vehicle 14 includes right and left front wheels 12FR, 12FL and right and left rear wheels 12RR, 12RL. The right and left front wheels 12FR, 12FL are steered wheels. The right and left rear wheels 12RR, 12RL are non-steered wheels. The vehicle 14 includes front wheel suspensions 18FR, 18FL and rear wheel suspensions 18RR, 18RL. The front wheel suspension 18FR suspends the front wheel 12FR from the vehicle body 16. The front wheel suspension 18FL suspends the front wheel 12FL from the vehicle body 16. The rear wheel suspension 18RR suspends the rear wheel 12RR from the vehicle body 16. The rear wheel suspension 18RL suspends the rear wheel 12RL from the vehicle body 16.

The front wheel suspension 18FR includes a suspension arm 20FR. The front wheel suspension 18FL includes a suspension arm 20FL. The rear wheel suspension 18RR includes a suspension arm 20RR. The rear wheel suspension 18RL includes a suspension arm 20RL. In FIG. 1, one of each of the suspension arms 20FR, 20FL, 20RR, 20RL is shown in the diagram; however, two or more of each arm may be provided.

The front wheel 12FR is supported by a wheel support member 22FR so as to be rotatable about a rotation axis (not shown). The front wheel 12FL is supported by a wheel support member 22FL so as to be rotatable about a rotation axis (not shown). The wheel support member 22FR is coupled to the vehicle body 16 by the suspension arm 20FR. The wheel support member 22FL is coupled to the vehicle body 16 by the suspension arm 20FL. Similarly, the rear wheel 12RR is supported by a wheel support member 22RR so as to be rotatable about a rotation axis (not shown). The rear wheel 12RL is supported by a wheel support member 22RL so as to be rotatable about a rotation axis (not shown). The wheel support member 22RR is coupled to the vehicle body 16 by the suspension arm 20RR. The wheel support member 22RL is coupled to the vehicle body 16 by the suspension arm 20RL.

The front wheel suspension 18FR includes a shock absorber 24FR and a suspension spring 26FR. The front wheel suspension 18FL includes a shock absorber 24FL and a suspension spring 26FL. Similarly, the rear wheel suspension 18RR includes a shock absorber 24RR and a suspension spring 26RR. The rear wheel suspension 18RL includes a shock absorber 24RL and a suspension spring 26RL. The damping coefficients of the shock absorbers 24FR, 24FL, 24RR, 24RL are constant. Instead, these shock absorbers 24FR, 24FL, 24RR, 24RL may be adjustable shock absorbers.

In the illustrated embodiment, the shock absorber 24FR is coupled to the vehicle body 16 at its upper end and coupled to the wheel support member 22FR at its lower end, and the shock absorber 24FL is coupled to the vehicle body 16 at its upper end and coupled to the wheel support member 22FL at its lower end. The suspension spring 26FR is elastically provided between the vehicle body 16 and the wheel support member 22FR via the shock absorber 24FR. The suspension spring 26FL is elastically provided between the vehicle body 16 and the wheel support member 22FL via the shock absorber 24FL. Alternatively, the shock absorber 24FR and the suspension spring 26FR may be disposed between the vehicle body 16 and the wheel support member 22FR or suspension arm 20FR, and the shock absorber 24FL and the suspension spring 26FL may be disposed between the vehicle body 16 and the wheel support member 22FL or suspension arm 20FL.

Similarly, the shock absorber 24RR is couple to the vehicle body 16 at its upper end and coupled to the wheel support member 22RR at its lower end, and the shock absorber 24RL is coupled to the vehicle body 16 at its upper end and coupled to the wheel support member 22RR at its lower end. The suspension spring 26RR is elastically provided between the vehicle body 16 and the wheel support member 22RR via the shock absorber 24RR. The suspension spring 26RL is elastically provided between the vehicle body 16 and the wheel support member 22RL via the shock absorber 24RL. Alternatively, the shock absorber 24RR and the suspension spring 26RR may be disposed between the vehicle body 16 and the wheel support member 22RR or suspension arm 20RR, and the shock absorber 24RL and the suspension spring 26RL may be disposed between the vehicle body 16 and the wheel support member 22RL or suspension arm 20RL.

The suspensions 18FR, 18FL, 18RR, 18RL may be suspensions of any type as long as the suspensions 18FR, 18FL, 18RR, 18RL allow the wheels 12FR, 12FL, 12RR, 12RL and the vehicle body 16 to be displaced each other in an up and down direction relative to the other. It is desirable that the suspensions 18FR, 18FL, 18RR, 18RL be independent suspensions. The suspension springs 26FR, 26FL, 26RR, 26RL may be any springs, such as compression coil springs and air springs.

As is apparent from the above description, at least the vehicle body 16 is a component of a sprung mass of the vehicle 14, and at least the wheels 12FR, 12FL, 12RR, 12RL and the wheel support members 22FR, 22FL, 22RR, 22RL are components of an unsprung mass of the vehicle 14.

In the illustrated embodiment, each of wheel actuators 28FR, 28FL, 28RR, 28RL is provided between the vehicle body 16 and a piston rod of a corresponding one of the shock absorbers 24FR, 24FL, 24RR, 24RL. Each of the wheel actuators 28FR, 28FL, 28RR, 28RL functions as an actuator that hydraulically or electromagnetically generates a force that acts between the vehicle body 16 and a corresponding one of the wheels 12FR, 12FL, 12RR, 12RL. Each of the wheel actuators 28FR, 28FL, 28RR, 28RL makes up an active suspension in cooperation with a corresponding one of the shock absorbers 24FR, 24FL, 24RR, 24RL, a corresponding one of the suspension springs 26FR, 26FL, 26RR, 26RL, and others. Each of the wheel actuators 28FR, 28FL, 28RR, 28RL may be an actuator having any configuration known in the technical field as long as the wheel actuator is able to generate a force that acts between the vehicle body 16 and a corresponding one of the wheels 12FR, 12FL, 12RR, 12RL under control of an electronic controller 30 that serves as an electronic control unit.

As will be described in detail later, the roll vibration damping control system 10 of the first embodiment is configured to damp the vibrations of the sprung mass as in the case of the vibration damping control systems of the other embodiments (described later). A signal that represents the roll angular acceleration $\phi s^2$ of the vehicle body 16 that serves as the sprung mass is input from a roll angular acceleration sensor 32 to the electronic controller 30. The roll angular acceleration $\phi s^2$ is detected on the assumption that a clockwise direction is positive when viewed in the travel direction. A signal that represents the vehicle speed V is input from a vehicle speed sensor 34 to the electronic controller 30.

The roll angular acceleration sensor 32 may have any configuration known in the technical field. For example, the roll angular acceleration sensor 32 may include two up and down acceleration sensors disposed on both sides of the center of gravity of the vehicle 14 in a transverse direction. Where the distance in the vehicle transverse direction between the center of gravity and the left-side up and down acceleration sensor is t1, the distance in the vehicle transverse direction between the center of gravity and the right-side up and down acceleration sensor is t2, the up and down acceleration detected by the left-side up and down acceleration sensor is Azl, and the up and down acceleration detected by the right-side up and down acceleration sensor is Azr, the roll angular acceleration $\phi s^2$ is computed by the following equation (33).

$$\Phi s^2 = (Azl - Azr)/(t1 + t2) \tag{33}$$

As will be described in detail later, the electronic controller 30 computes a controlled roll moment Mxc and a correction roll moment Mxa for correcting the controlled roll moment Mxc in accordance with control programs corresponding to the flowcharts and block diagram shown in FIG. 2 to FIG. 5. The electronic controller 30 computes a target roll moment Mxt by correcting the controlled roll moment Mxc with the correction roll moment Mxa. The electronic controller 30 computes target forces Fzj (j=fr, fl, rr, rl) to be generated by the wheel actuators 28FR, 28FL, 28RR, 28RL for applying a roll moment corresponding to the target roll moment Mxt to the vehicle body 16 based on the target roll moment Mxt. The electronic controller 30 controls the wheel actuators 28FR, 28FL, 28RR, 28RL such that the forces Fzj (j=fr, fl, rr, rl) to be generated by the wheel actuators 28FR, 28FL, 28RR, 28RL respectively become the corresponding target forces Fzj. The suffixes fr, fl, rr, and rl respectively denote the right front wheel, the left front wheel, the right rear wheel, and the left rear wheel.

Although not shown in FIG. 1, the electronic controller 30 includes a microcomputer and driver circuits. The microcomputer includes a CPU, a ROM, a RAM, and an input/output port device, and has a general configuration in which the CPU, the ROM, the RAM, and the input/output port device are connected to one another by a bidirectional common bus. The control programs for controlling the wheel actuators 28FR, 28FL, 28RR, 28RL are stored in the ROM, and the wheel actuators 28FR, 28FL, 28RR, 28RL are controlled by the CPU in accordance with the control programs. The ROM stores the roll moment of inertia $I_x$, roll damping coefficient $C_x$, and equivalent roll stiffness $K_x'$ of the vehicle 14. The ROM stores the control gain a and others.

Figure 2:
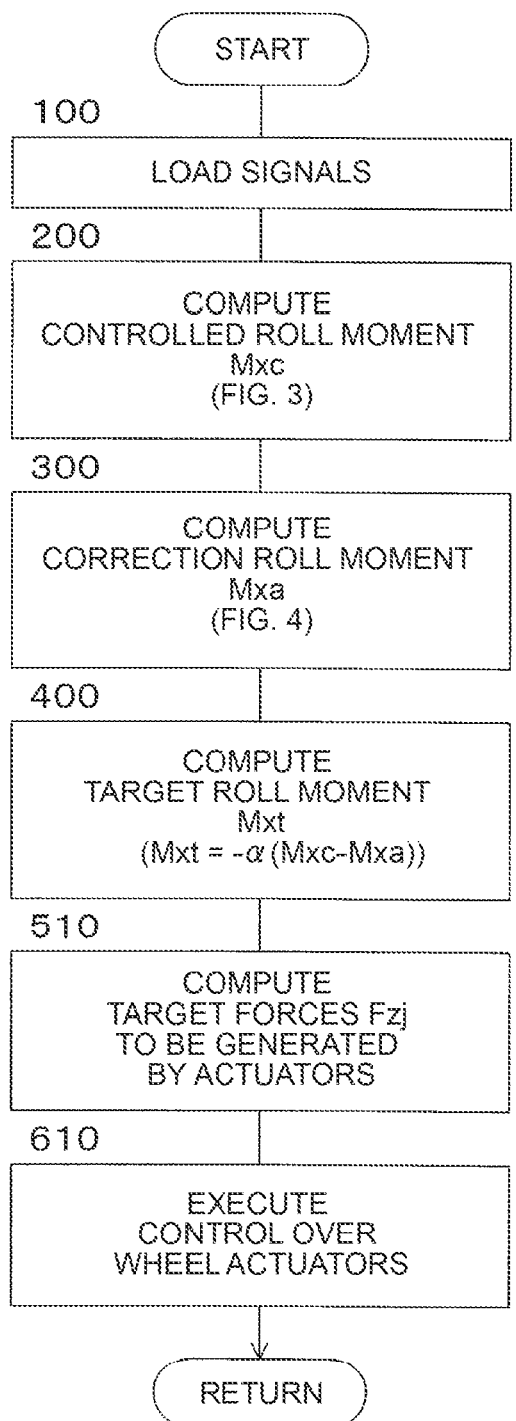
FIG. 2 is a flowchart that shows the main routine of vibration damping control in the first embodiment.

Main Routine of Vibration Damping Control (FIG. 2)

Next, the main routine of vibration damping control in the first embodiment will be described with reference to the flowchart shown in FIG. 2. Control of the flowchart shown in FIG. 2 is repeatedly executed at predetermined time intervals by the electronic controller 30 when an ignition switch not shown in the drawing is on. This also applies to vibration damping control of the other embodiments (described later).

First, in step 100, a signal that represents the roll angular acceleration $\phi s^2$ of the vehicle body 16, detected by the roll angular acceleration sensor 32, and a signal that represents the vehicle speed V detected by the vehicle speed sensor 34 are loaded.

Figure 3:
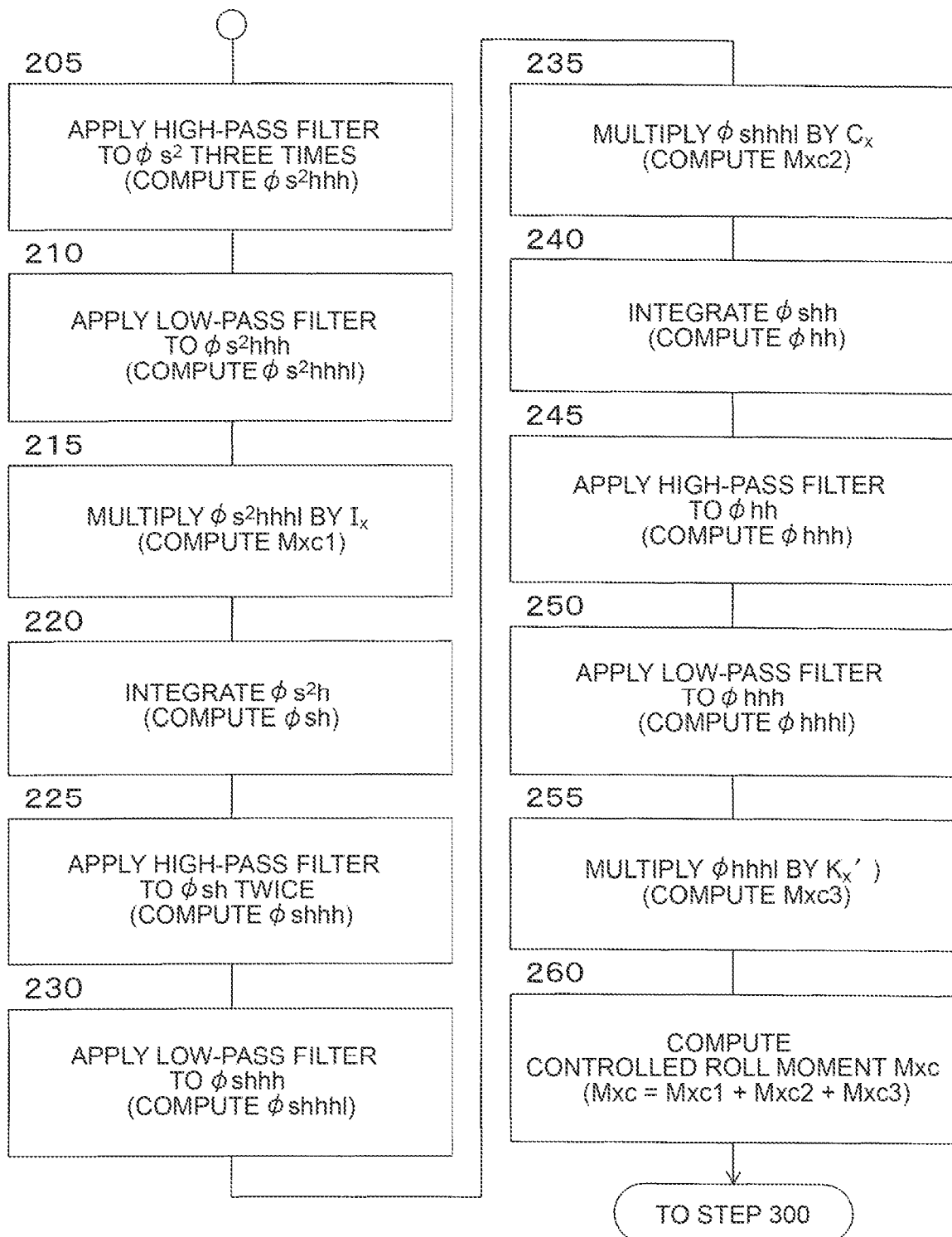
FIG. 3 is a flowchart that shows the routine of computing a controlled roll moment, which is executed in step 200 of FIG. 2.

In step 200, the controlled roll moment Mxc to be applied to the vehicle body 16 to damp the roll vibrations of the vehicle body 16 is computed in accordance with the subroutine shown in FIG. 3.

Figure 4:
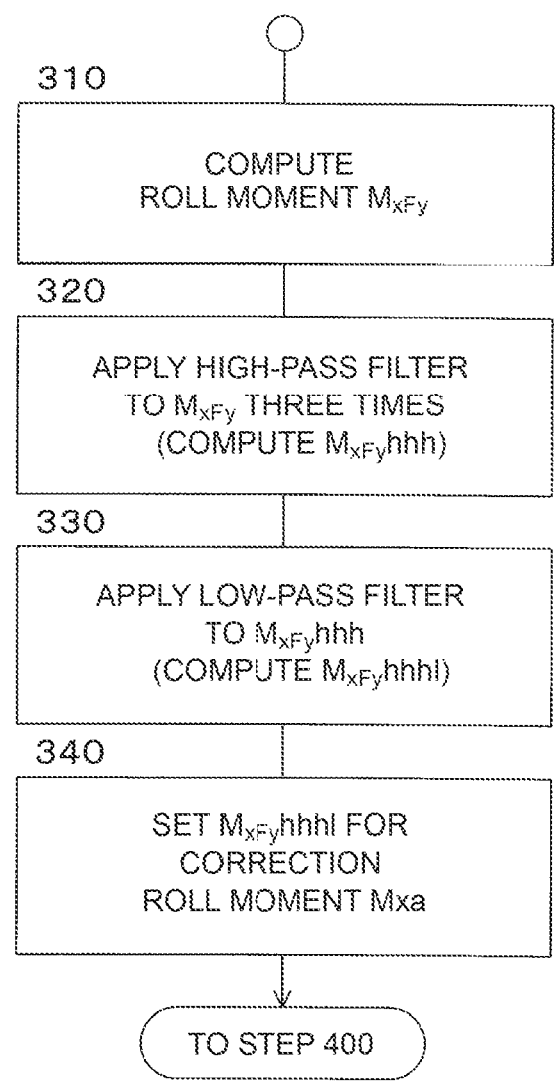
FIG. 4 is a flowchart that shows the routine of computing a correction roll moment, which is executed in step 300 of FIG. 2.

In step 300, the correction roll moment Mxa for avoiding a change in the dynamic characteristics of the roll motion of the vehicle 14 is computed in accordance with the subroutine shown in FIG. 4.

In step 400, the target roll moment Mxt is computed by multiplying the difference Mxc−Mxa between the controlled roll moment Mxc and the correction roll moment Mxa by a control gain coefficient −α in accordance with the following equation (34).

$$Mxt = -\alpha(Mxc - Mxa) \tag{34}$$

In step 510, the target forces Fzj (j=fr, fl, rr, rl) to be generated by the wheel actuators 28FR, 28FL, 28RR, 28RL to apply the roll moment corresponding to the target roll moment Mxt to the vehicle body 16 are computed.

In this case, the target forces Fzj may be computed in the following manner. The controlling forces Fzfr, Fzfl, Fzrr, Fzrl in the up and down direction, which are respectively generated by the wheel actuators 28FR, 28FL, 28RR, 28RL, are determined as the controlling force F that is expressed by the following equation (35). The controlled roll moment $M_{xc}$, a controlled pitch moment Myc, a controlled heave force Fzc, and a controlled warp force Fwc are determined as a control command value u that is expressed by the following equation (36). The controlling force F is computed in accordance with the following equation (37) while the controlled roll moment Mxc is set to the target roll moment Mxt and the controlled pitch moment Myc, the controlled heave force Fzc, and the controlled warp force Fwc are set to zero. In the following equation (37), C is expressed by the following equation (38).

$$F = [F_{zfl}\ F_{zfr}\ F_{zrl}\ F_{zrr}]^T \quad (35)$$

$$u = [M_{xc}\ M_{yc}\ F_{zc}\ F_{wc}]^T \quad (36)$$

$$F = C^{-1}u \quad (37)$$

$$C = \begin{bmatrix} \frac{t_f}{2} & -\frac{t_f}{2} & \frac{t_r}{2} & -\frac{t_r}{2} \\ -l_f & -l_f & l_r & l_r \\ 1 & 1 & 1 & 1 \\ 1 & -1 & -1 & 1 \end{bmatrix} \quad (38)$$

In the following equation (38), tf is a tread between the front wheels 12FR, 12FL, tr is a tread between the rear wheels 12RR, 12RL, lf is a distance in the vehicle front and rear direction between the center of gravity of the vehicle 14 and a front wheel axle, and lr is a distance in the vehicle front and rear direction between the center of gravity of the vehicle 14 and a rear wheel axle.

In step 600, the wheel actuators 28FR, 28FL, 28RR, 28RL are controlled such that the forces Fj generated by the wheel actuators 28FR, 28FL, 28RR, 28RL respectively become the corresponding target forces Fxj. Thus, the roll moment corresponding to the target roll moment Mxt is applied to the vehicle body 16.

Computation of Controlled Roll Moment Mxc (FIG. 3)

Next, computation of the controlled roll moment Mxc, which is executed in step 200, will be described with reference to the flowchart shown in FIG. 3. The roll moment of inertia $I_x$, roll damping coefficient $C_x$, and equivalent roll stiffness $K_x'$ of the vehicle 14 are determined based on the specifications of the vehicle 14 to which the vibration damping control system of each embodiment is applied.

In step 205, the same high-pass filter is applied to the roll angular acceleration $\phi s^2$ of the vehicle body 16 three times. Thus, a high-pass filtered (three times) roll angular acceleration $\phi s^2 hhh$ is computed. A value $\phi s^2 h$ obtained by applying the high-pass filter to the roll angular acceleration $\phi s^2$ once is stored in the RAM.

In step 210, the low-pass filter is applied to the roll angular acceleration $\phi s^2 hhh$. Thus, a low-pass filtered roll angular acceleration $\phi s^2 hhhl$ is computed.

In step 215, the roll angular acceleration $\phi s^2 hhhl$ is multiplied by the roll moment of inertia $I_x$. Thus, a first controlled roll moment Mxc1 is computed.

In step 220, the roll angular acceleration $\phi s^2 h$ computed by applying the high-pass filter to the roll angular acceleration $\phi s^2$ of the vehicle body 16 once in step 205 is integrated. Thus, the roll angular velocity $\phi sh$ of the vehicle body 16 is computed.

In step 225, the same high-pass filter as the high-pass filter in step 205 is applied to the roll angular velocity $\phi sh$ twice. Thus, a high-pass filtered (twice) roll angular velocity $\phi shhh$ is computed. A value $\phi shh$ obtained by applying the high-pass filter to the roll angular velocity $\phi sh$ once is stored in the RAM.

In step 230, the same low-pass filter as the low-pass filter in step 210 is applied to the roll angular velocity $\phi shhh$. Thus, a low-pass filtered roll angular velocity $\phi shhhl$ is computed.

In step 235, the roll angular velocity $\phi shhhl$ is multiplied by the roll damping coefficient $C_x$. Thus, a second controlled roll moment Mxc2 is computed.

In step 240, the roll angular velocity $\phi shh$ computed by applying the high-pass filter to the roll angular velocity $\phi sh$ once in step 225 is integrated. Thus, a roll angle $\phi hh$ of the vehicle body 16 is computed.

In step 245, the same high-pass filter as the high-pass filter in step 205 is applied to the roll angle $\phi hh$ once. Thus, a high-pass filtered roll angle $\phi hhh$ is computed.

In step 250, the same low-pass filter as the low-pass filter in step 210 is applied to the roll angle $\phi hhh$. Thus, a low-pass filtered roll angle $\phi hhhl$ is computed.

In step 255, the roll angle $\phi hhhl$ is multiplied by the equivalent roll stiffness $K_x'$. Thus, a third controlled roll moment Mxc3 is computed.

In step 260, the controlled roll moment Mxc that is the sum of the first to third controlled roll moments Mxc1, Mxc2, Mxc3 is computed in accordance with the following equation (39).

$$Mxc = Mxc1 + Mxc2 + Mxc3 \quad (39)$$

Block Diagram of Computation of Correction Roll Moment Mxa (FIG. 4)

Next, computation of the correction roll moment Mxa, which is executed in step 300, will be described with reference to the flowchart shown in FIG. 4.

In step 310, the roll moment $M_{xFy}$ that is generated by the lateral force F on the vehicle 14 is computed in accordance with the equation (23) based on the roll angular acceleration $\phi s^2$ and the vehicle speed V.

In step 320, the same high-pass filter as the high-pass filter in step 205 is applied to the roll moment $M_{xFy}$ three times. Thus, a high-pass filtered (three times) roll moment $M_{xFy}hhh$ is computed.

In step 330, the same low-pass filter as the low-pass filter in step 210 is applied to the roll moment $M_{xFy}hhh$. Thus, a low-pass filtered roll moment $M_{xFy}hhhl$ is computed.

In step 340, the roll moment $M_{xFy}hhhl$ is set for the correction roll moment Mxa.

Figure 5:
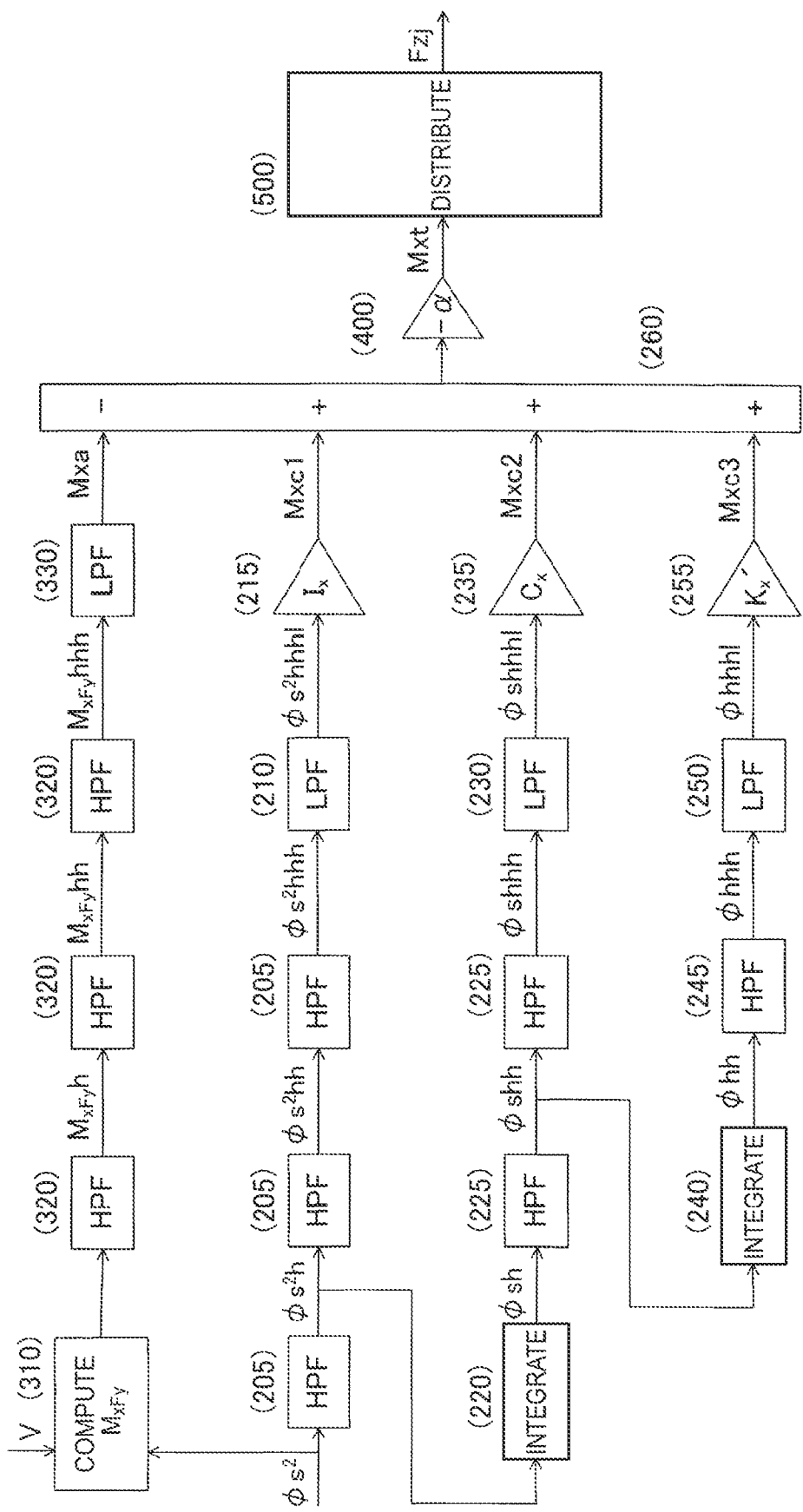
FIG. 5 is a block diagram that shows signal processing through the routine of step 200 to step 510 in FIG. 2.

As shown in FIG. 5, the same high-pass filter is applied to the roll angular acceleration $\phi s^2$ and roll moment $M_{xFy}$ of the vehicle body 16 three times, and the same low-pass filter is applied to the roll angular acceleration $\phi s^2$ and roll moment $M_{xFy}$ of the vehicle body 16 once. The high-pass filtered and low-pass filtered roll angular acceleration, roll angular velocity, and roll angle are respectively multiplied by the roll moment of inertia $I_x$, the roll damping coefficient $C_x$, and the equivalent roll stiffness $K_x'$. Thus, the first to third controlled roll moments Mxc1, Mxc2, Mxc3 are computed.

The sum of the three controlled roll moments Mxc1, Mxc2, Mxc3 is multiplied by the control gain coefficient $-\alpha$. Thus, the target roll moment Mxt is computed. The target forces Fzj to be generated by the wheel actuators 28FR, 28FL, 28RR, 28RL for applying the roll moment corresponding to the target roll moment Mxt to the vehicle body 16 are computed. In FIG. 5, the numbers in parentheses indicate the step numbers of the flowcharts shown in FIG. 2 to FIG. 4.

As is apparent from the above description, in the first embodiment, the actuators that generate the roll moment to be applied to the vehicle body 16 are the active suspensions that are provided in association with the wheels 12FR, 12FL, 12RR, 12RL and generate forces that act between the sprung mass and the unsprung mass. Since the wheel actuators 28FR, 28FL, 28RR, 28RL of the active suspensions are controlled based on the target forces Fzj, the roll moment corresponding to the target roll moment Mxt is applied to the vehicle body 16.

Since the target roll moment Mxt is computed in accordance with the equation (34), the target roll moment Mxt is computed as a value obtained by correcting the controlled roll moment Mxc with the correction roll moment Mxa. Thus, the transfer function from the roll angle $\phi_1$ of the unsprung mass 102 to the roll angle $\phi$ of the sprung mass 104 is not the equation (21), and is the equation (25), so the roll vibrations of the sprung mass are damped without changing the dynamic characteristics of the roll motion of the vehicle 14. The roll vibrations of the sprung mass are damped without the need to detect the roll angle $\phi_1$ of the unsprung mass. These operation and advantageous effects are also obtained in the other embodiments that will be described later.

As described above, the same high-pass filter is applied to the roll angular acceleration $\phi s^2$ and roll moment $M_{xFy}$ of the vehicle body 16 three times, and the same low-pass filter is applied to the roll angular acceleration $\phi s^2$ and roll moment $M_{xFy}$ of the vehicle body 16 once. Thus, adverse influence due to an integral offset is removed by the high-pass filter. In comparison with the case where the number of applications of the high-pass filter and low-pass filter that are applied to the roll angular acceleration $\phi s^2$ and roll moment $M_{xFy}$ and whether the high-pass filter or the low-pass filter is applied to the roll angular acceleration $\phi s^2$ or the roll moment $M_{xFy}$ are different from those of the first embodiment, the possibility of a phase shift in the controlled roll moment or correction roll moment is reduced, so the roll vibrations of the sprung mass are suitably damped. The roll angular acceleration and others are processed by removing high-frequency noise with the low-pass filter so as to be able to accommodate a delay of control of the electronic controller or actuators. In comparison with the case where different low-pass filters are applied to the roll angular acceleration and others, the possibility of an error or shift of control timing due to high-frequency noise in the controlled roll moment or correction roll moment is reduced. These operation and advantageous effects are also obtained in the other embodiments that will be described later.

Figure 6:
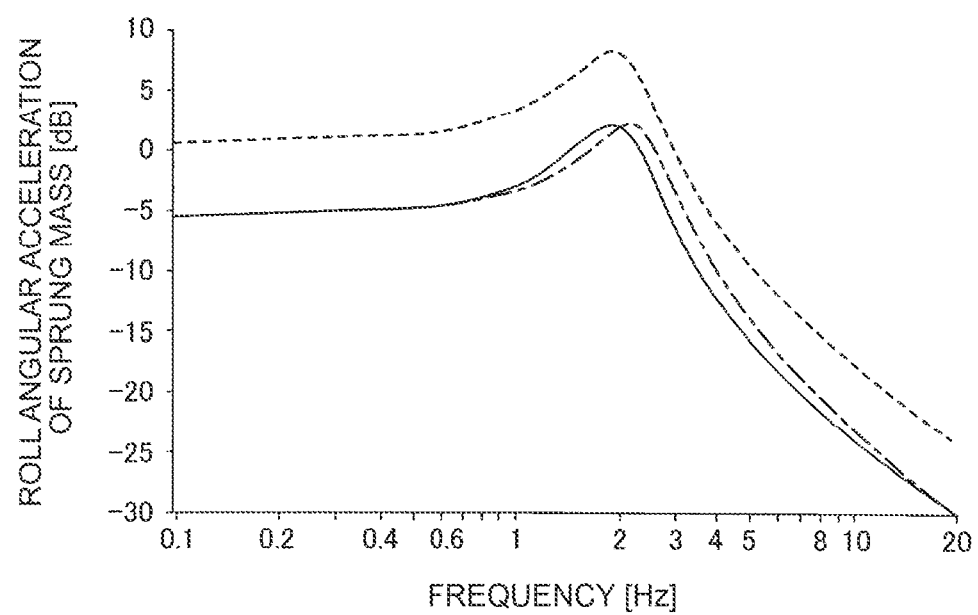
FIG. 6 is a Bode diagram that shows the relationship between a frequency and a roll angular acceleration of a sprung mass due to a road surface input when a vehicle speed is 20 km/h.
Figure 7:
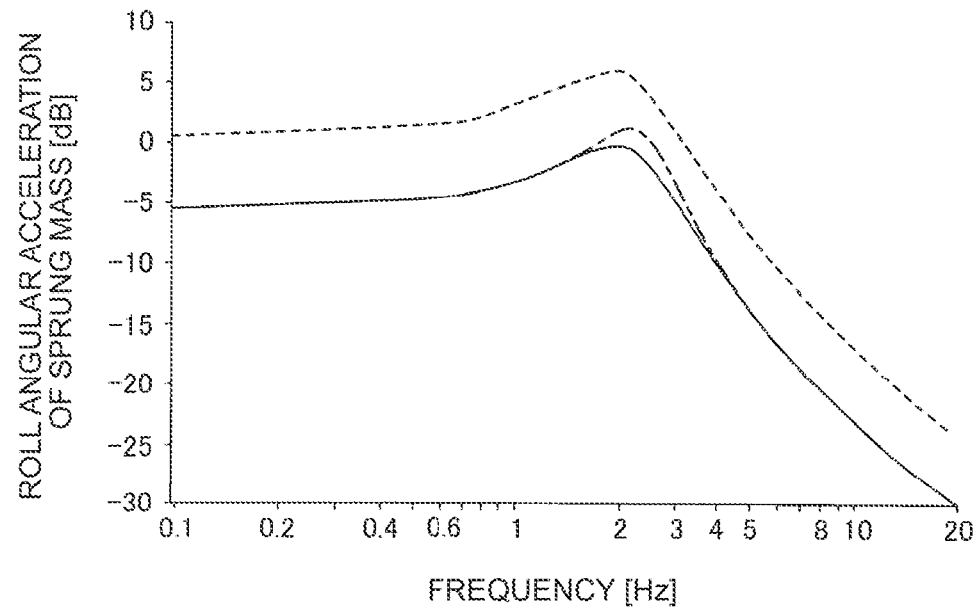
FIG. 7 is a Bode diagram that shows the relationship between a frequency and a roll angular acceleration of a sprung mass due to a road surface input when a vehicle speed is 80 km/h.

FIG. 6 is a Bode diagram that shows the relationship between a frequency and a roll angular acceleration of the sprung mass due to a road surface input when the vehicle speed is 20 km/h. FIG. 7 is a Bode diagram that shows the relationship between a frequency and a roll angular acceleration of the sprung mass due to a road surface input when the vehicle speed is 80 km/h. In these diagrams, the continuous lines represent the case of the embodiments of the disclosure, the broken lines represent the case where roll vibrations are not damped (first comparative example), and the alternate long and short dashes lines represent the case where a correction using the correction roll moment Mxa is not performed (second comparative example).

According to the embodiments of the disclosure and the second comparative example, it is clear that the roll vibrations of the sprung mass are damped over the entire frequency range as compared to the first comparative example. According to the embodiments of the disclosure, it is clear that the roll vibrations of the sprung mass are effectively damped in a frequency range higher than the resonant frequency of the sprung mass as compared to the second comparative example and the advantageous effect is remarkable at a lower vehicle speed.

Particularly, according to the first embodiment, the active suspensions are provided in association with all the wheels, and the controlling force F is computed in step 510 in accordance with the equation (37) while the controlled roll moment Mxc is set to the target roll moment Mxt and the controlled pitch moment Myc, the controlled heave force Fzc, and the controlled warp force Fwc are set to zero. Thus, the roll vibrations of the sprung mass are damped without adverse influence on the orientation of the vehicle 14 in any of pitch, heave, and warp modes.

According to the first embodiment, since the controlling force F is computed in accordance with the equation (37), the roll vibrations of the sprung mass are damped while the orientation of the vehicle 14 in pitch, heave, and warp modes is controlled to a target orientation when the controlling force F is computed while the controlled pitch moment Myc, the controlled heave force Fzc, and the controlled warp force Fwc are set to target values of attitude control.

Second Embodiment

Figure 8:
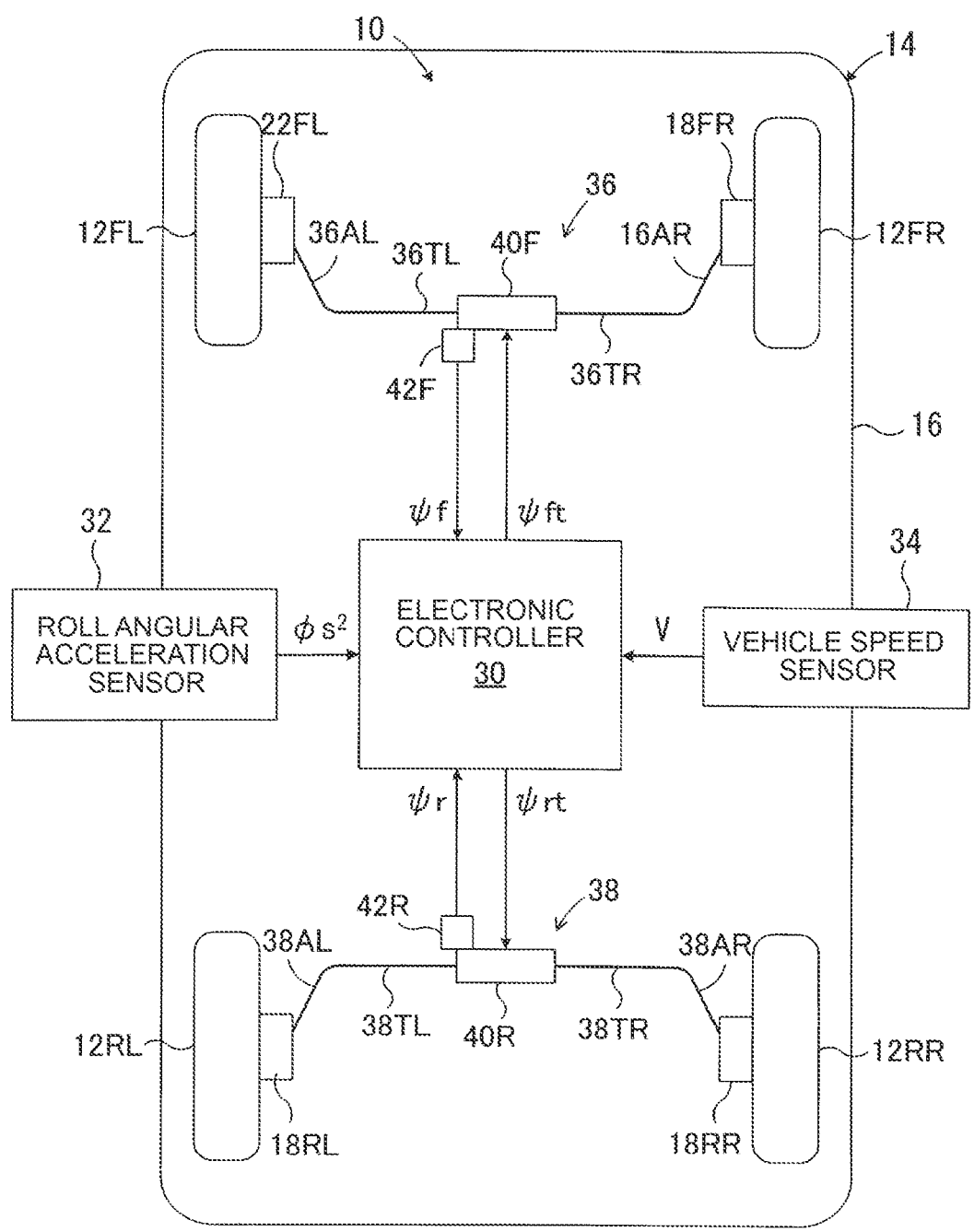
FIG. 8 is a schematic configuration diagram that shows a roll vibration damping control system according to a second embodiment of the disclosure, which is applied to a vehicle including a front active stabilizer and a rear active stabilizer.

As shown in FIG. 8, the second embodiment is applied to the vehicle 14 including a front active stabilizer 36 and a rear active stabilizer 38. The front active stabilizer 36 and the rear active stabilizer 38 function as actuators that generate a roll moment to be applied to the vehicle body 16. The front active stabilizer 36 is provided between the right and left front wheels 12FR, 12FL. The rear active stabilizer 38 is provided between the right and left rear wheels 12RR, 12RL. As will be described later, the active stabilizers 36, 38 respectively apply roll moments to the vehicle body 16 at the positions of the front wheels 12FR, 12FL and rear wheels 12RR, 12RL in the vehicle front and rear direction, thus changing an anti-roll moment.

The active stabilizer 36 includes a pair of torsion bar portions 36TR, 36TL, and a pair of arm portions 36AR, 36AL. The torsion bar portions 36TR, 36TL extend so as to be aligned coaxially with each other in the transverse direction of the vehicle 14. The arm portions 36AR, 36AL are respectively integrated with the outer ends of the torsion bar portions 36TR, 36TL. Each of the torsion bar portions 36TR, 36TL is supported via a bracket (not shown) by the vehicle body (not shown) so as to be rotatable about its axis. Each of the arm portions 36AR, 36AL extends in a direction inclined from the vehicle transverse direction toward the vehicle front and rear direction so as to intersect with a corresponding one of the torsion bar portions 36TR, 36TL. The outer end of each of the arm portions 36AR, 36AL is coupled to a corresponding one of the front wheel suspensions 18FR, 18FL or a corresponding one of wheel support members like a suspension arm of a corresponding one of the right and left front wheels 12FR, 12FL via a connecting rod, a rubber bushing, and others (not shown).

The active stabilizer 36 includes an actuator 40F between the torsion bar portions 36TR, 36TL. The actuator 40F incorporates an electric motor. When the right and left front wheels 12FR, 12FL bound and rebound in opposite phases from each other, torsional stresses that reduce the bounds or rebounds of the wheels occur at the torsion bar portions 36TR, 36TL. The actuator 40F changes the torsional stresses by relatively rotating the torsion bar portions 36TR, 36TL as needed. Thus, the actuator 40F increases or reduces the anti-roll moment that is applied to the vehicle body 16 at the position of the front wheels 12FR, 12FL, thus changing the roll stiffness of the vehicle 14 on the front wheel side.

Similarly, the active stabilizer 38 includes a pair of torsion bar portions 38TR, 38TL, and a pair of arm portions 38AR, 38AL. The torsion bar portions 38TR, 38TL extend so as to be aligned coaxially with each other in the transverse direction of the vehicle 14. The arm portions 38AR, 38AL are respectively integrated with the outer ends of the torsion bar portions 38TR, 38TL. Each of the torsion bar portions 38TR, 38TL is supported via a bracket (not shown) by the vehicle body (not shown) so as to be rotatable about its axis. Each of the arm portions 38AR, 38AL extends in a direction inclined from the vehicle transverse direction toward the vehicle front and rear direction so as to intersect with a corresponding one of the torsion bar portions 38TR, 38TL. The outer end of each of the arm portions 38AR, 38AL is coupled to a corresponding one of the rear wheel suspensions 18RR, 18RL or a corresponding one of wheel support members like a suspension arm of a corresponding one of the right and left rear wheels 12RR, 12RL via a connecting rod, a rubber bushing, and others (not shown).

The active stabilizer 38 includes an actuator 40R between the torsion bar portions 38TR, 38TL. The actuator 40R incorporates an electric motor. When the right and left rear wheels 12RR, 12RL bound and rebound in opposite phases from each other, torsional stresses that reduce the bounds or rebounds of the wheels occur at the torsion bar portions 38TR, 38TL. The actuator 40R changes the torsional stresses by relatively rotating the torsion bar portions 38TR, 38TL as needed. Thus, the actuator 40R increases or decreases an anti-roll moment that is applied to the vehicle body 16 at the position of the rear wheels 12RR, 12RL, thus changing the roll stiffness of the vehicle 14 on the rear wheel side.

The structures of the active stabilizers 36, 38 are not specifically limited. Thus, each of the active stabilizers 36, 38 may have any configuration known in the technical field as long as the active stabilizer is able to control the roll moment to be applied to the vehicle body 16 by controlling forces that act in the up and down direction in opposite phases on the vehicle body 16 at the positions of the right and left wheels.

Each of the actuators 40F, 40R of the active stabilizers 36, 38 is controlled by a control current that is supplied to a corresponding one of the electric motors by the electronic controller 30. Signals that represent actual rotation angles ψf, ψr of the actuators 40F, 40R, detected by rotation angle sensors 42F, 42R, are input to the electronic controller 30.

As in the case of the first embodiment, the electronic controller 30 computes the target roll moment Mxt, and computes target relative rotation angles ψft, ψrt of the actuators 40F, 40R for applying a roll moment corresponding to the target roll moment Mxt to the vehicle 14 based on the target roll moment Mxt. The electronic controller 30 controls the actuators 40F, 40R such that the relative rotation angles ψvf, ψr of the actuators 40F, 40R, which are detected by the rotation angle sensors 42F, 42R, respectively become the target relative rotation angles ψft, ψrt.

Figure 9:
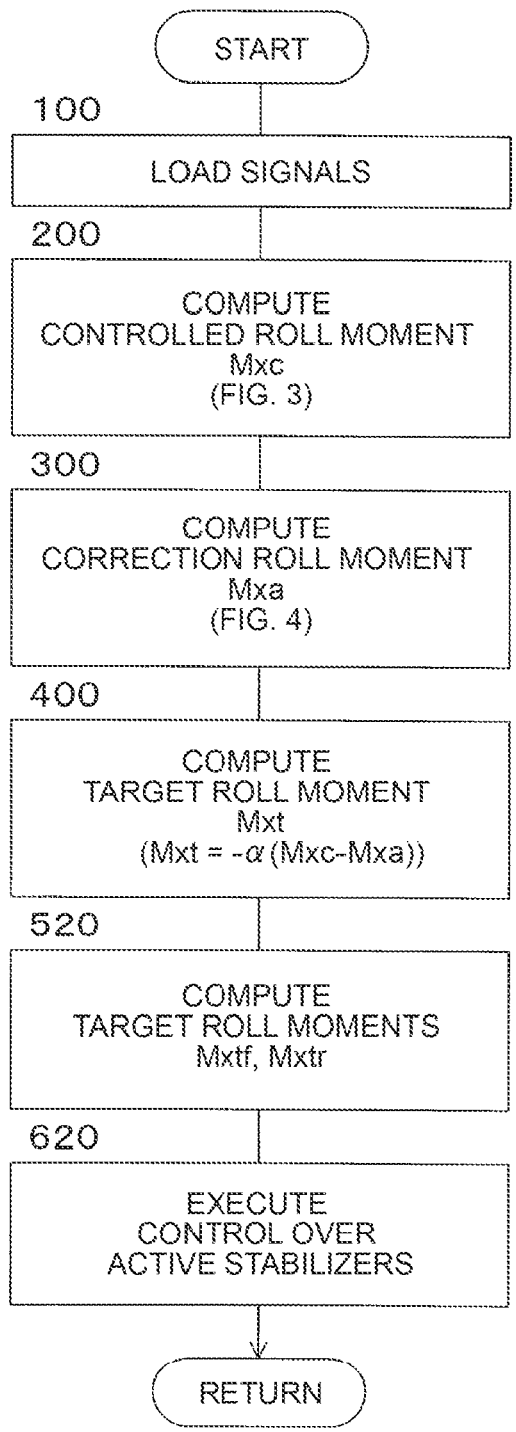
FIG. 9 is a flowchart that shows the main routine of vibration damping control in the second embodiment.

In the second embodiment, the CPU of the electronic controller 30 executes roll vibration damping control in accordance with the flowchart shown in FIG. 9. In FIG. 9, like step numbers to the step numbers shown in FIG. 2 are assigned to the same steps as the steps shown in FIG. 2. This also applies to the other embodiments that will be described later.

Step 100 to step 400 are executed similarly to step 100 to step 400 in the first embodiment. As step 400 completes, step 520 and step 620 are executed.

In step 520, the distribution rates of roll moment of the active stabilizers 36, 38 are set to Rsf (a positive constant greater than or equal to zero and less than or equal to one) and 1−Rsf, and the target roll moments Mxtf, Mxtr of the active stabilizers 36, 38 are computed in accordance with the following equations (40), (41). The target relative rotation angles ψft, ψrt of the actuators 40F, 40R are computed based on the target roll moments Mxtf, Mxtr.

$$Mxtf = Rsf \times Mxt \quad (40)$$

$$Mxtr = (1-Rsf) \times Mxt \quad (41)$$

In step 620, the actuators 40F, 40R are controlled such that the relative rotation angles ψf, ψr of the actuators 40F, 40R respectively become the target relative rotation angles ψft, ψrt. Thus, the roll moment corresponding to the target roll moment Mxt is applied to the vehicle body 16.

As is apparent from the above description, in the second embodiment, the actuator that generates a roll moment to be applied to the vehicle body 16 is made up of the front and rear active stabilizers 36, 38 that apply roll moment to the sprung mass at the positions corresponding to the front wheels 12FR, 12FL and the rear wheels 12RR, 12RL. The target roll moment Mxt is distributed to the target roll moments Mxtf, Mxtr of the active stabilizers 36, 38. The actuators 40F, 40R of the active stabilizers 36, 38 are controlled based on the target roll moments Mxtf, Mxtr, so the roll moment corresponding to the target roll moment Mxt is applied to the vehicle body 16.

Thus, according to the second embodiment, as in the case of the first embodiment, the roll vibrations of the sprung mass are damped without changing the dynamic characteristics of roll motion of the vehicle 14 and without the need to detect the roll angle φ1 of the unsprung mass.

Particularly, according to the second embodiment, the front and rear active stabilizers 36, 38 are controlled. Thus, a roll moment is applied to the sprung mass at the positions corresponding to the front wheels 12FR, 12FL and the rear wheels 12RR, 12RL. In comparison with the case where only the front active stabilizer 36 or the rear active stabilizer 38 is provided and a roll moment is applied to the sprung mass only at the position corresponding to the front wheels 12FR, 12FL or the rear wheels 12RR, 12RL, the possibility of adverse influence of roll vibration damping control on the orientation of the vehicle 14 is reduced.

The front active stabilizer 36 or the rear active stabilizer 38 may be omitted. For example, when the rear active stabilizer 38 is omitted, the distribution rate Rsf is one, so the target roll moment Mxtf is set for the target roll moment Mxt, and the actuator 40F is controlled based on the target roll moment Mxtf.

In contrast to this, when the front active stabilizer 36 is omitted, the distribution rate Rsf is zero, so the target roll moment Mxtr is set for the target roll moment Mxt, and the actuator 40R is controlled based on the target roll moment Mxtr.

Third Embodiment

Figure 10:
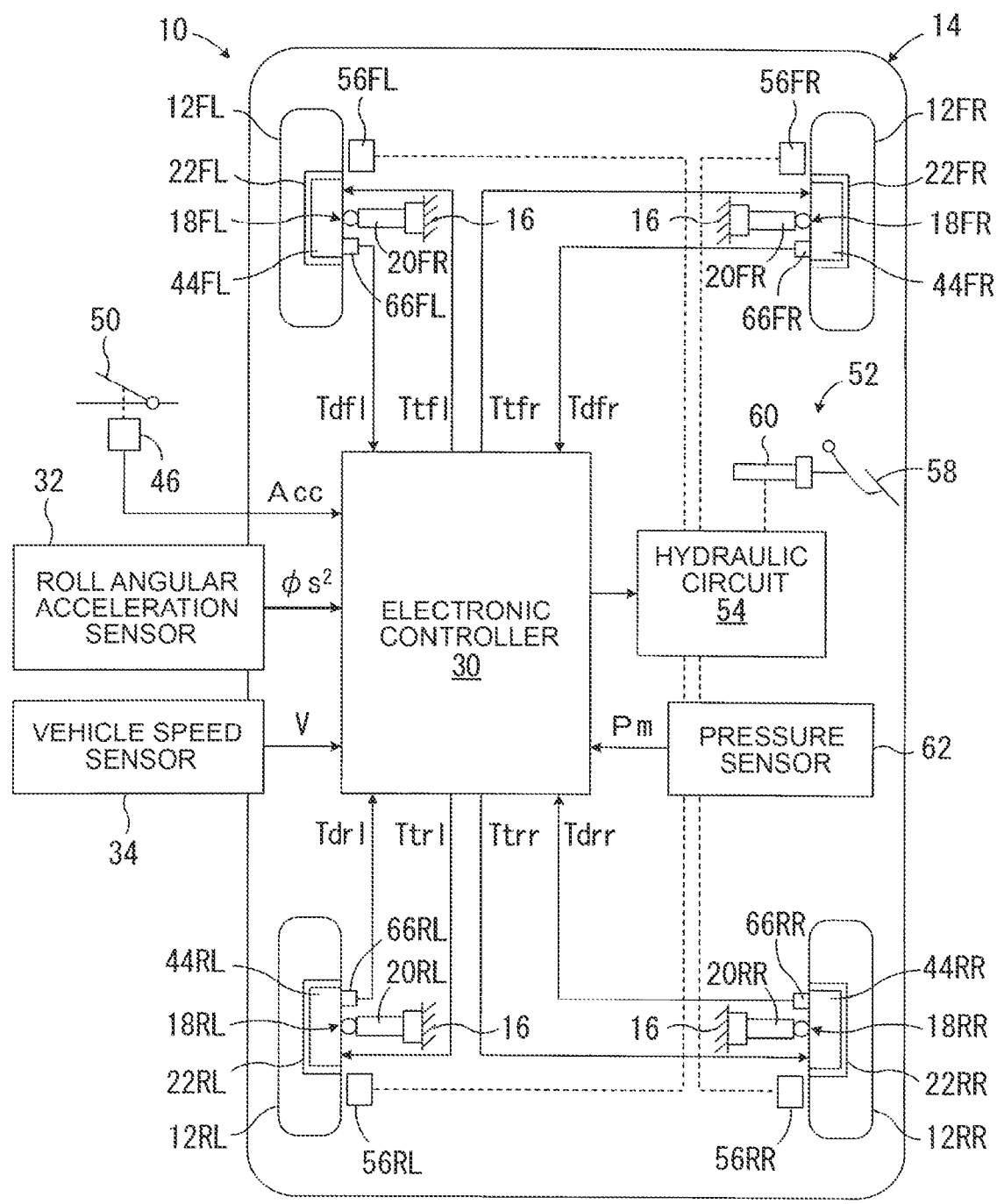
FIG. 10 is a schematic configuration diagram that shows a roll vibration damping control system according to a third embodiment of the disclosure, which is applied to a vehicle in which an in-wheel motor is assembled to each wheel.

As shown in FIG. 10, the roll vibration damping control system 10 of the third embodiment is applied to the vehicle 14 in which in-wheel motors 44FR, 44FL, 44RR, 44RL that function as actuators that generate a roll moment to be applied to the vehicle body 16 are respectively assembled to the wheels. Each of the front wheels 12FR, 12FL is driven by driving torque that is applied independently via a reduction gear (not shown in FIG. 1) from a corresponding one of the in-wheel motors 44FR, 44FL respectively assembled to the wheel support members 22FR, 22FL. Similarly, each of the rear wheels 12RR, 12RL is driven by driving torque that is applied independently via a reduction gear (not shown in FIG. 1) from a corresponding one of the in-wheel motors 44RR, 44RL respectively assembled to the wheel support members 22RR, 22RL.

The in-wheel motors 44FR, 44FL, 44RR, 44RL just need be electric motors that are able to control driving torque and rotation speed, and may be, for example, three-phase brushless alternating-current motors. It is desirable that each of the in-wheel motors 44FR, 44FL, 44RR, 44RL function as a regenerative generator during braking and generate regenerative braking torque. However, each of the in-wheel motors 44FR, 44FL, 44RR, 44RL does not need to perform regenerative braking.

The driving force of each of the in-wheel motors 44FR, 44FL, 44RR, 44RL is controlled by a driving force control unit of the electronic controller 30 based on an accelerator operation amount Acc that is detected by an accelerator operation amount sensor 46, as will be described in detail later. The accelerator operation amount Acc represents the amount of depression of an accelerator pedal 50, that is, driver's driving operation amount. The regenerative braking force of each of the in-wheel motors 44FR, 44FL, 44RR, 44RL is controlled via the driving force control unit by a braking force control unit of the electronic controller 30.

During normal travel of the vehicle 14, electric power stored in a battery (not shown in FIG. 1) is supplied to the in-wheel motors 44FR, 44FL, 44RR, 44RL via driver circuits in the driving force control unit. During braking of the vehicle 14, electric power generated through regenerative braking by the in-wheel motors 44FR, 44FL, 44RR, 44RL is charged into the battery via the driver circuits.

Frictional braking force is applied by a frictional braking device 52 to each of the front wheels 12FR, 12FL and the rear wheels 12RR, 12RL independently of one another. The frictional braking force of each of the front wheels 12FR, 12FL and the rear wheels 12RR, 12RL is controlled by the pressure, that is, the braking pressure, in a corresponding one of wheel cylinders 56FR, 56FL, 56RR, 56RL being controlled by a hydraulic circuit 54 of the frictional braking device 52. Although not shown in the drawing, the hydraulic circuit 54 includes a reservoir, an oil pump, various valve devices, and others.

The pressures in the wheel cylinders 56FR, 56FL, 56RR, 56RL are controlled according to the pressure (hereinafter, referred to as master cylinder pressure) in a master cylinder 60 that is driven according to depression of a brake pedal 58 by a driver during normal times. The master cylinder pressure represents a depression force on the brake pedal 58, that is, a braking operation amount of the driver. The pressure in each of the wheel cylinders 56FR, 56FL, 56RR, 56RL is controlled by the oil pump and various valve devices being controlled by the braking force control unit of the electronic controller 30 as needed regardless of the depression amount of the brake pedal 58 by the driver.

In the illustrated embodiment, the frictional braking device 52 is a hydraulic frictional braking device. Alternatively, the frictional braking device 52 may be an electromagnetic frictional braking device as long as the frictional braking device is able to apply frictional braking force to the wheels independently of one another.

Although not shown in the drawing, the instantaneous centers of the right front wheel 12FR and left front wheel 12FL are respectively located above and on the vehicle rear side of contact points and axles of the right front wheel 12FR and left front wheel 12FL. Thus, the front wheel suspensions 18FR, 18FL have an anti-dive geometry. On the other hand, the instantaneous centers of the right rear wheel 12RR and left rear wheel 12RL are respectively located above and on the vehicle front side of contact points and axles of the right rear wheel 12RR and left rear wheel 12RL. Thus, the rear wheel suspensions 18RR, 18RL have an anti-lift geometry.

Therefore, when front and rear force acts on the wheels, part of the front and rear force is converted to a force in the up and down direction by the suspensions as will be described later.

Although not shown in the drawing, let an angle that a line segment connecting the instantaneous center of each of the right and left front wheels 12FR, 12FL to the contact point makes with a horizontal direction when viewed in the vehicle transverse direction be $\theta_f$. Similarly, let an angle that a line segment connecting the instantaneous center of each of the right and left rear wheels 12RR, 12RL to the contact point makes with the horizontal direction when viewed in the vehicle transverse direction be $\theta_r$. The angle $\theta_f$ when each of the right and left front wheels 12FR, 12FL is at a neutral position is an anti-dive angle. The angle $\theta_r$ when each of the right and left rear wheels 12RR, 12RL is at a neutral position is an anti-lift angle.

As is known, since the front wheel suspensions 18FR, 18FL have an anti-dive geometry, when the front and rear force $F_{xfr}$ of the right front wheel 12FR and the front and rear force $F_{xfl}$ of the left front wheel 12FL are driving forces, the vehicle body 16 receives downward forces $F_{xfr}$ tan $\theta_f$, $F_{xfl}$ tan $\theta_f$ from the right and left front wheels 12FR, 12FL. On the other hand, since the rear wheel suspensions 18RR, 18RL have an anti-lift geometry, when front and rear forces $F_{xrr}$, $F_{xrl}$ are driving forces, the vehicle body 16 receives upward forces $F_{xrr}$ tan $\theta_r$, $F_{xrl}$ tan $\theta_r$ from the right and left rear wheels 12RR, 12RL.

A signal that represents the roll angular acceleration $\phi s^2$ of the vehicle body 16, detected by the roll angular acceleration sensor 32, a signal that represents the vehicle speed V detected by the vehicle speed sensor 34, and a signal that represents the accelerator operation amount Acc detected by the accelerator operation amount sensor 46 are input to the electronic controller 30. A signal that represents the master cylinder pressure Pm detected by a pressure sensor 62 is input to the electronic controller 30. The electronic controller 30 basically controls braking and driving forces of the four wheels by controlling the in-wheel motors 54FR, 54FL, 54RR, 54RL and the frictional braking device 52 based on the accelerator operation amount Acc and the master cylinder pressure Pm such that the braking and driving forces of the vehicle 14 coincide with braking and driving forces required by the driver.

Torque sensors 66FR, 66FL, 66RR, 66RL that detect driving torques Tdi (i =fr, fl, rr, rl) of the corresponding in-wheel motors 44FR, 44FL, 44RR, 44RL are respectively incorporated in the in-wheel motors 44FR, 44FL, 44RR, 44RL. Signals that respectively represent the driving torques Tdi are input from the torque sensors 66FR, 66FL, 66RR, 66RL to the electronic controller 30.

Figure 11:
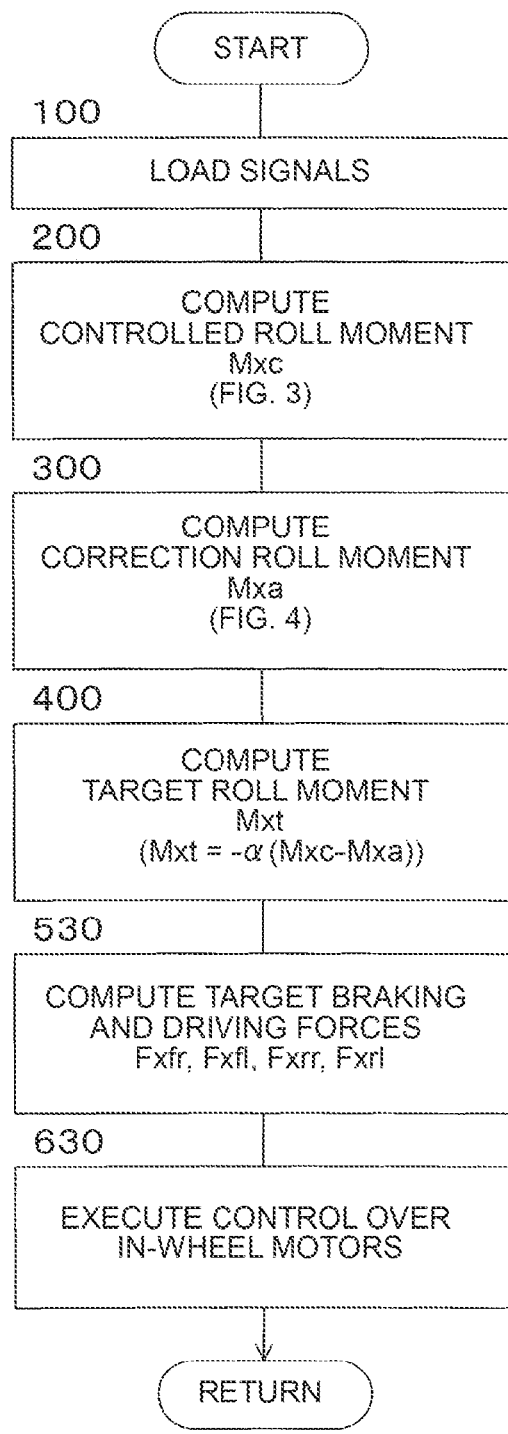
FIG. 11 is a flowchart that shows the main routine of vibration damping control in the third embodiment.

In the third embodiment, the CPU of the electronic controller 30 executes roll vibration damping control in accordance with the flowchart shown in FIG. 11. Step 100 to step 400 are executed similarly to step 100 to step 400 in the first embodiment. As step 400 completes, step 530 and step 630 are executed.

In step 530, the target braking and driving forces Fxj (j=fr, fl, rr, rl) of the in-wheel motors 44FR, 44FL, 44RR, 44RL for applying a roll moment corresponding to the target roll moment Mxt to the vehicle body 16 are computed.

In this case, the target braking and driving forces Fxj may be computed in the following manner. The braking and driving forces Fxfr, Fxfl, Fxrr, Fxrl of the wheels 12FR, 12FL, 12RR, 12RL are determined as the front and rear force F that is expressed by the following equation (42). The controlled roll moment Mxc, the controlled pitch moment Myc, the controlled heave force Fzc, and the controlled warp force Fwc are determined as a control command value u that is expressed by the following equation (43) that is the same as the equation (36). The front and rear force F is computed in accordance with the following equation (44) while the controlled roll moment Mxc is set to the target roll moment Mxt and the controlled pitch moment Myc, the controlled heave force Fzc, and the controlled warp force Fwc are set to zero. In the following equation (44), C is expressed by the following equation (45).

$$F = [F_{xfl}\ F_{xfr}\ F_{xrl}\ F_{xrr}]^T \quad (42)$$

$$u = [F_{xc}\ M_{xc}\ M_{yc}\ M_{zc}]^T \quad (43)$$

$$F = C^{-1}u \quad (44)$$

$$C = \begin{bmatrix} 1 & 1 & 1 & 1 \\ -\frac{t_f}{2}\tan\theta_f & \frac{t_f}{2}\tan\theta_f & \frac{t_r}{2}\tan\theta_f & -\frac{t_r}{2}\tan\theta_f \\ l_f\tan\theta_f & l_f\tan\theta_f & l_r\tan\theta_r & l_r\tan\theta_r \\ \frac{t_f}{2} & -\frac{t_f}{2} & -\frac{t_r}{2} & \frac{t_r}{2} \end{bmatrix} \quad (45)$$

In step 630, the in-wheel motors 44FR, 44FL, 44RR, 44RL are controlled such that the braking and driving forces Ffr, Ffl, Frr, Frl of the wheels 12FR, 12FL, 12RR, 12RL, which are determined based on the accelerator operation amount Acc and the master cylinder pressure Pm, are respectively corrected by the braking and driving forces Fxfr, Fxfl, Fxrr, Fxrl. Thus, the roll moment corresponding to the target roll moment Mxt is applied to the vehicle body 16.

As is apparent from the above description, in the third embodiment, the actuator that generates a roll moment to be applied to the vehicle body 16 includes the in-wheel motors 44FR, 44FL, 44RR, 44RL respectively assembled to the wheels 12FR, 12FL, 12RR, 12RL, and generates a roll moment by using the fact that the front and rear forces of the wheels 12FR, 12FL, 12RR, 12RL are converted to up and down forces by the suspensions. The roll moment that is generated and applied to the vehicle body 16 is a roll moment corresponding to the target roll moment Mxt.

Thus, according to the third embodiment, as in the case of the first and second embodiments, the roll vibrations of the sprung mass are damped without changing the dynamic characteristics of roll motion of the vehicle 14 and without the need to detect the roll angle ϕ1 of the unsprung mass.

Particularly, in the third embodiment, the up and down forces can be changed at the positions of the wheels 12FR, 12FL, 12RR, 12RL. As in the case of the first embodiment, in step 530, the front and rear force F is computed in accordance with the equation (44) while the controlled roll moment Mxc is set to the target roll moment Mxt and the controlled pitch moment Myc, the controlled heave force Fzc, and the controlled warp force Fwc are set to zero. Thus, the roll vibrations of the sprung mass are damped without adverse influence on the orientation of the vehicle 14 in the pitch, heave, and warp modes.

According to the third embodiment, since the controlling force F is computed in accordance with the equation (44), the roll vibrations of the sprung mass are damped while the orientation of the vehicle 14 in the pitch, heave, and warp modes to a target orientation when the controlling force F is computed while the controlled pitch moment Myc, the controlled heave force Fzc, and the controlled warp force Fwc are set to target values of attitude control.

Fourth Embodiment

Figure 12:
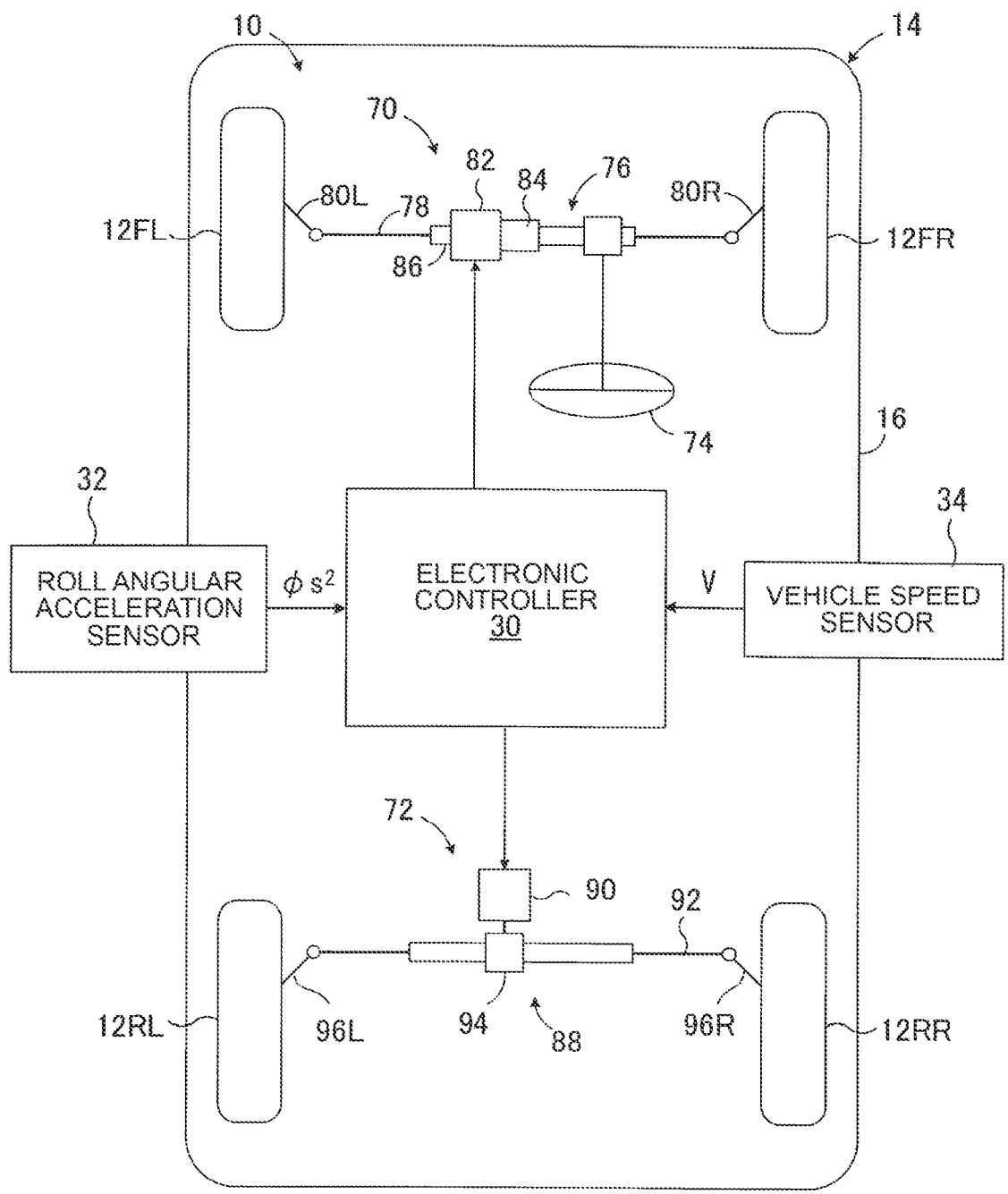
FIG. 12 is a schematic configuration diagram that shows a roll vibration damping control system according to a fourth embodiment of the disclosure, which is applied to a vehicle equipped with front wheel and rear wheel active steering systems.

As shown in FIG. 12, the roll vibration damping control system 10 of the fourth embodiment is applied to the vehicle 14 on which front wheel and rear wheel active steering systems 70, 72 that function as actuators that generate a roll moment to be applied to the vehicle body 16 are mounted. In FIG. 12, the suspensions are not shown.

The front wheel active steering system 70 includes a rack-and-pinion electric power steering system 76 that is driven in response to driver's operation of a steering wheel 74. The power steering system 76 turns the right and left front wheels 12FR, 12FL that are main steered wheels via a rack bar 78 and tie rods 80R, 80L. The power steering system 76 generates steering assist torque for reducing a burden on driver's steering operation during normal times, and changes a wheel steering angle δf by turning the right and left front wheels 12FR, 12FL as needed regardless of driver's steering operation.

In the illustrated embodiment, the electric power steering system 76 is a rack-direct electric power steering, and includes an electric motor 82 and, for example, a ball-screw conversion mechanism 84. The ball-screw conversion mechanism 84 converts the rotating torque of the electric motor 82 to a force in the reciprocation direction of the rack bar 78. The electric power steering system 76 is controlled by the electronic controller 30, and generates steering assist torque and front wheel turning torque by driving the rack bar 78 relative to a housing 86.

The rear wheel active steering system 72 includes a rack-and-pinion rear wheel steering system 88 that is driven regardless of driver's steering operation. The rear wheel steering system 88 is an electric auxiliary steering system having a known configuration, and includes an electric motor 90 and, for example, a screw-type motion conversion mechanism 94. The screw-type motion conversion mechanism 94 converts the rotation of the electric motor 90 to the reciprocating motion of a relay rod 92. The relay rod 92 is a component of a wheel steering mechanism that turns and drives the right and left rear wheels 12RR, 12RL as a result of the reciprocating motion of the relay rod 92 in cooperation with the tie rods 96R, 96L and knuckle arms (not shown).

When the front wheels 12FR, 12FL and the rear wheels 12RR, 12RL are turned and the slip angle changes, tire lateral forces Fyfδ, Fyrδ occur, and a roll moment Mxδ around the center of gravity of the sprung mass is generated by these lateral forces. Where the difference between the height of the roll center and the height of the center of gravity, that is, the roll arm length, at the position of the front wheels 12FR, 12FL is hsf and the difference between the height of the roll center and the height of the center of gravity, that is, the roll arm length, at the position of the rear wheels 12RR, 12RL is hsr, the roll moment Mxδ is expressed by the following equation (46).

$$M_{x\delta} = h_{sf}F_{yf\delta} + h_{sr}F_{yr\delta} \quad (46)$$

Where the yaw rate of the vehicle 14 is γ and the yaw moment of inertia of the vehicle 14 is $I_z$, the equation of motion of the vehicle 14 in the transverse direction is expressed by the following equation (47) and the equation of motion of the vehicle 14 in a yaw direction is expressed by the following equation (48).

$$mV(\beta s + r) = F_{yf\delta} + F_{yr\delta} \quad (47)$$

$$I_z rS = l_f F_{yf\delta} - l_r F_{yr\delta} \quad (48)$$

Where the normalized equivalent cornering power of the front wheels 12FR, 12FL is $C_f$, the normalized equivalent cornering power of the rear wheels 12RR, 12RL is $C_r$, the slip angle of the front wheels 12FR, 12FL is $\beta f$, and the slip angle of the rear wheels 12RR, 12RL is $\beta r$, the tire lateral forces $F_{yf\delta}$, $F_{yr\delta}$ are respectively expressed by the following equations (49), (50). The slip angles $\beta_f$, $\beta_r$ are respectively expressed by the following equations (51), (52).

$$F_{yf\delta} = C_f \frac{l_r}{l} mg(\delta_f - \beta_f) \tag{49}$$

$$F_{yr\delta} = C_f \frac{l_f}{l} mg(\delta_r - \beta_r) \tag{50}$$

$$\beta_f = \beta + \frac{l_f}{v} r \tag{51}$$

$$\beta_r = \beta - \frac{l_r}{v} r \tag{52}$$

When the wheel steering angle of the front wheels 12FR, 12FL and the wheel steering angle of the rear wheels 12RR, 12RL are controlled, control with two degrees of freedom is possible. Therefore, target wheel steering angles $\delta_{ft}$, $\delta_{rt}$ of the front wheels 12FR, 12FL and rear wheels 12RR, 12RL for applying a roll moment corresponding to the target roll moment Mxt to the vehicle body 16 cannot be computed by using the equations (46), (47), (48), (49), (50), (51), (52). When Influence of Roll Vibration Damping Control on Slip Angle $\beta$ of Vehicle Is Removed As a constraint, the equations (46), (47), (48), (49), (50), (51), (52) are solved for the wheel steering angles $\delta_f$, $\delta_r$ of the front wheels 12FR, 12FL and rear wheels 12RR, 12RL and the yaw rate $\gamma$ of the vehicle 14 on the condition that $\beta$ is set to zero. Thus, transfer functions $\delta f/Mxt$, $\delta r/Mxt$ are obtained. Thus, the wheel steering angles $\delta_f$, $\delta_r$ that are obtained by substituting the target roll moment Mxt into those transfer functions are set for the target wheel steering angles $\delta_{ft}$, $\delta_{rt}$ of the front wheels 12FR, 12FL and rear wheels 12RR, 12RL. When Influence of Roll Vibration Damping Control on Yaw Rate $\gamma$ of Vehicle Is Removed As a constraint, the equations (46), (47), (48), (49), (50), (51), (52) are solved for the wheel steering angles $\delta_f$, $\delta_r$ of the front wheels 12FR, 12FL and rear wheels 12RR, 12RL and the yaw rate $\gamma$ of the vehicle 14 on the condition that $\gamma$ is set to zero. Thus, transfer functions $\delta_f/Mxt$, $\delta_r/Mxt$ are obtained. Thus, the wheel steering angles $\delta_f$, $\delta_r$ that are obtained by substituting the target roll moment Mxt into those transfer functions are set for the target wheel steering angles $\delta_{ft}$, $\delta_{rt}$ of the front wheels 12FR, 12FL and rear wheels 12RR, 12RL.

Figure 13:
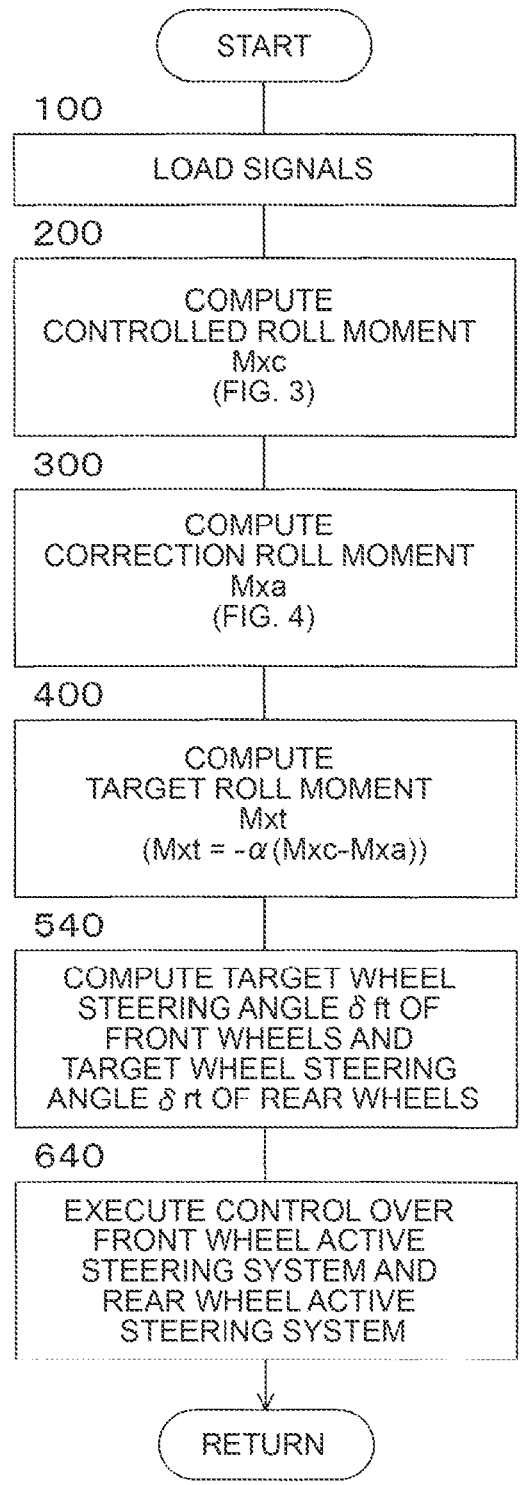
FIG. 13 is a flowchart that shows the main routine of vibration damping control in the fourth embodiment.

In the fourth embodiment, the CPU of the electronic controller 30 executes roll vibration damping control in accordance with the flowchart shown in FIG. 13. Step 100 to step 400 are executed similarly to step 100 to step 400 in the first embodiment. As step 400 completes, step 540 and step 640 are executed.

In step 540, the slip angle $\beta$ of the vehicle 14 or the yaw rate $\gamma$ of the vehicle 14 is set to zero as described above, and the target wheel steering angles $\delta_{ft}$, $\delta_{rt}$ of the front wheels 12FR, 12FL and rear wheels 12RR, 12RL for applying a roll moment corresponding to the target roll moment Mxt to the vehicle body 16 are computed.

In step 640, the front wheel active steering system 70 and the rear wheel active steering system 72 are controlled such that the wheel steering angles $\delta_f$, $\delta_r$, which are determined through driver's steering operation, autonomous driving control, or others, are respectively corrected to the target wheel steering angles $\delta_{ft}$, $\beta_{rt}$.

Thus, according to the fourth embodiment, as in the case of the first to third embodiments, the roll vibrations of the sprung mass are damped without changing the dynamic characteristics of roll motion of the vehicle 14 and without the need to detect the roll angle $\phi1$ of the unsprung mass.

Particularly, according to the fourth embodiment, since the wheel steering angles of the front wheels 12FR, 12FL and rear wheels 12RR, 12RL are controlled, it is possible to select whether to remove the influence of roll vibration damping control on the slip angle $\beta$ of the vehicle 14 or to remove the influence of roll vibration damping control on the yaw rate y of the vehicle 14.

Fifth Embodiment

Although not shown in the drawing, the roll vibration damping control system 10 of the fifth embodiment is applied to the vehicle 14 on which only the front wheel active steering system 70 that functions as an actuator that generates a roll moment to be applied to the vehicle body 16 is mounted. That is, the rear wheel active steering system 72 shown in FIG. 12 is not provided. Alternatively, even when the rear wheel active steering system 72 is provided, the rear wheel active steering system 72 is not used to damp the roll vibrations of the sprung mass.

A transfer function Mx$\delta$/$\delta$f of the roll moment Mx$\delta$ with respect to the wheel steering angle $\delta$f of the front wheels 12FR, 12FL is obtained, and is set for Gf(s) as shown in the following equation (53). It is assumed that the transfer function does not come under the influence of the roll angle $\phi$ of the vehicle body 16.

$$\frac{M_{x\delta}}{\delta_f} = G_f(s) \tag{53}$$

To bring the roll moment $M_{x\delta}$ that is generated by the tire lateral force $F_{yr\delta}$ of the front wheels 12FR, 12FL to the target roll moment Mxt, the wheel steering angle $\delta$f of the front wheels 12FR, 12FL, which is derived from the target roll moment Mxt through the inverse function $G^{-1}f(s)$ of the transfer function Gf(s), just needs to be set for the target wheel steering angle $\delta$ft as shown in the following equation (54). As shown in the following equation (55), when the wheel steering angle of the front wheels 12FR, 12FL is set such that $\delta f=\delta ft$, the roll moment $M_{x\delta}$ becomes the target roll moment Mxt.

$$\delta_f = G_f^{-1}(s) M_{xt} \tag{54}$$

$$M_{x\delta} = G_f(s) \delta_f \tag{55}$$
$$= G_f(s)\left(G_f^{-1}(s) M_{xt}\right)$$
$$= M_{xt}$$

Figure 14:
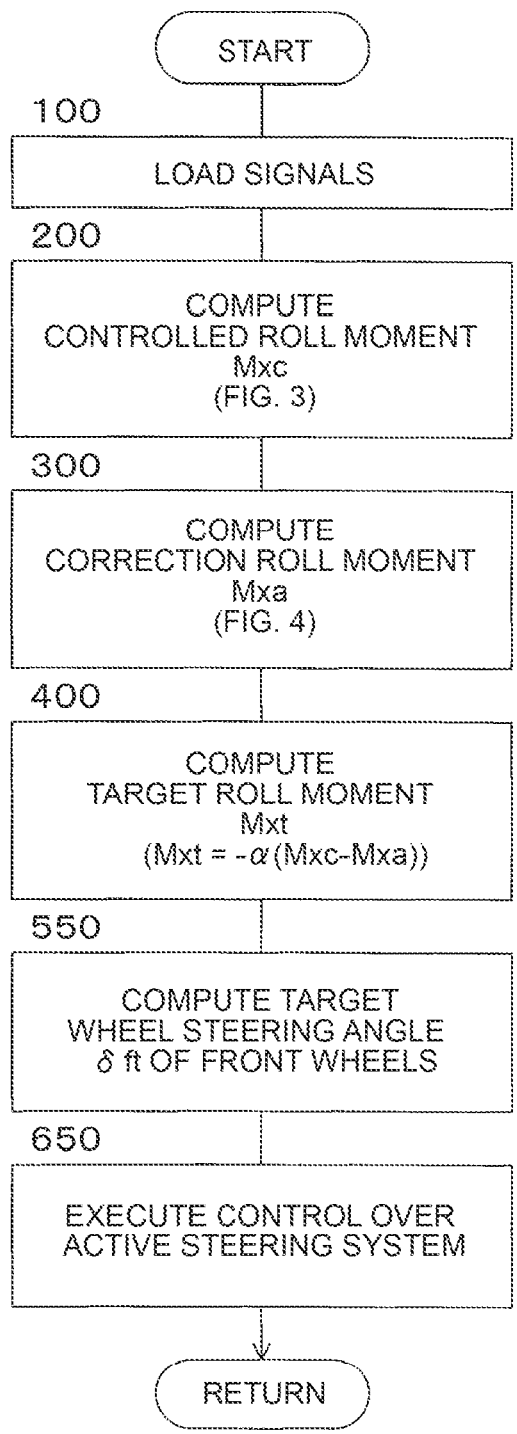
FIG. 14 is a flowchart that shows the main routine of vibration damping control in the fifth embodiment.

In the fifth embodiment, the CPU of the electronic controller 30 executes roll vibration damping control in accordance with the flowchart shown in FIG. 14. Step 100 to step 400 are executed similarly to step 100 to step 400 in the first embodiment. As step 400 completes, step 550 and step 650 are executed.

In step 550, the wheel steering angle δf of the front wheels 12FR, 12FL is obtained by using the equation (54) as described above, and the wheel steering angle δ$_{ft}$ is set for the target wheel steering angle δft of the front wheels 17FR, 17FL for applying a roll moment corresponding to the target roll moment Mxt to the vehicle body 16.

In step 650, the front wheel active steering system 70 is controlled such that the wheel steering angle of the front wheels 17FR, 17FL, which is determined through driver's steering operation, autonomous driving control, or others, is corrected to the target wheel steering angle δ$_{ft}$.

Thus, according to the fifth embodiment, as in the case of the first to fourth embodiments, the roll vibrations of the sprung mass are damped without changing the dynamic characteristics of roll motion of the vehicle 14 and without the need to detect the roll angle φ1 of the unsprung mass.

The example embodiments of the disclosure are described in detail above; however, the scope of the claims is not limited to the above-described embodiments. It is apparent to persons skilled in the art that various other embodiments may be implemented within the scope of the claims.

Figure 15:
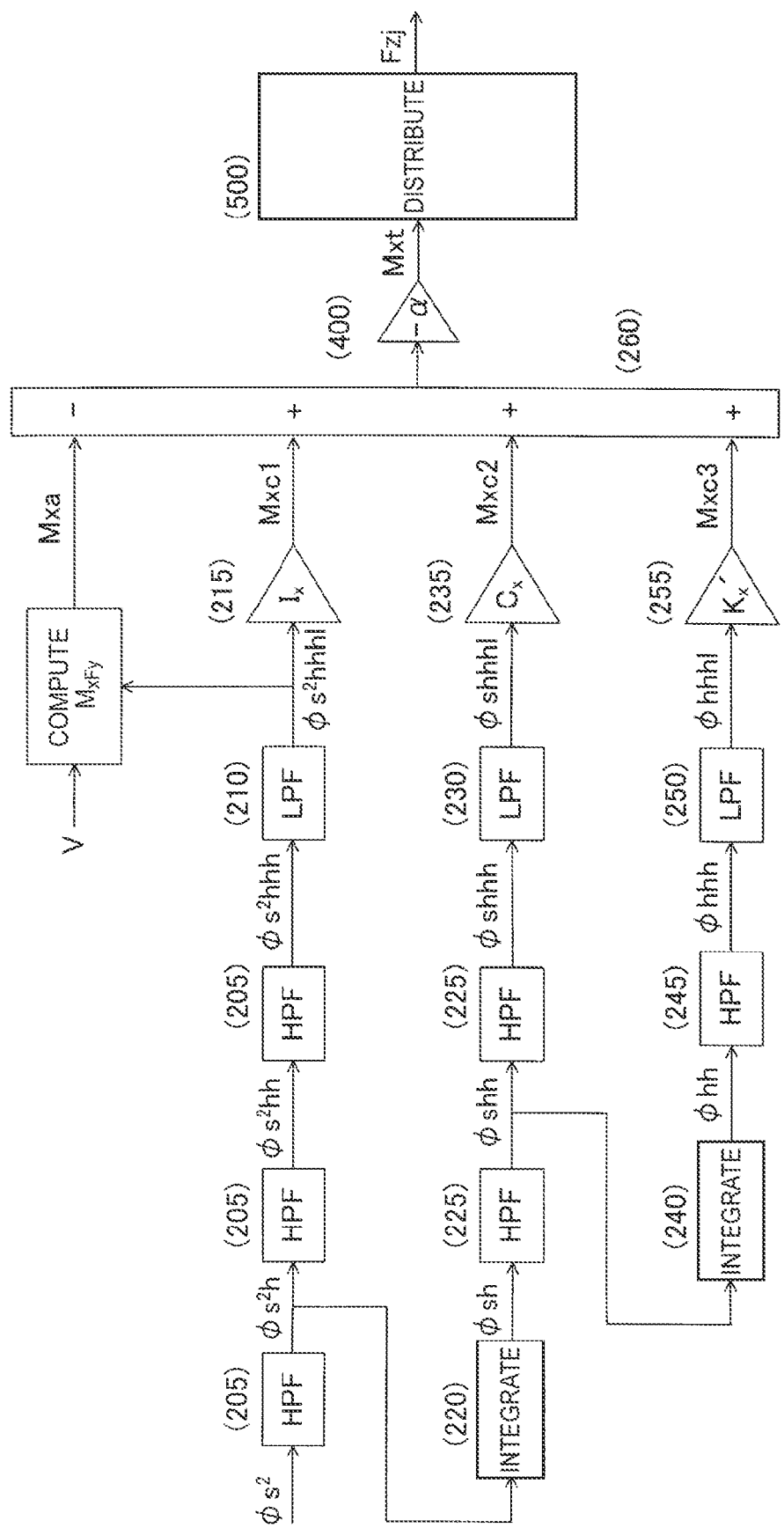
FIG. 15 is a block diagram that shows signal processing in a modification of the first embodiment.

For example, in the above-described embodiments, as shown in FIG. 4, the roll moment M$_{xFy}$ is computed based on the roll angular acceleration φs$^2$ and the vehicle speed V, the high-pass filter is applied to the roll moment M$_{xFy}$ three times, and then the low-pass filter is applied once. Thus, the correction roll moment Mxa is computed. However, as shown in FIG. 15, the correction roll moment Mxa may be computed based on the roll angular acceleration φs$^2$ and the vehicle speed V to which the high-pass filter has been applied three times and the low-pass filter has been applied once.

The roll angular acceleration sensor 32 illustrated in the above-described embodiments includes two up and down acceleration sensors disposed on both sides of the center of gravity of the vehicle 14 in the transverse direction. Instead, the roll angular acceleration φs$^2$ of the vehicle body 16 may be computed based on values detected by four up and down acceleration sensors provided on the vehicle body 16 in association with the wheels 12FR, 12FL, 12RR, 12RL. Alternatively, the roll angular acceleration φs$^2$ of the vehicle body 16 may be obtained by differentiating a value detected by a roll rate sensor provided on the vehicle body 16.

In the above-described embodiments, the same high-pass filter is applied to the roll angular acceleration φs$^2$, roll angular velocity φs, roll angle φ, and roll moment M of the vehicle body 16 three times. Instead, for example, the high-pass filter that is applied to the roll angular acceleration φs$^2$ may be omitted, and the number of applications of the high-pass filter to the roll angular acceleration φs$^2$, roll angular velocity φs, roll angle φ, and roll moment M$_{xFy}$ may be changed to two.

In the above-described embodiments, the same high-pass filter is applied to the roll angular acceleration φs$^2$, roll angular velocity φs, roll angle φ, and roll moment M$_{xFy}$ of the vehicle body 16 three times. Instead, the high-pass filter may be different once from the high-pass filter of the other times, or high-pass filters that are respectively applied to the roll angular acceleration φs$^2$, the roll angular velocity φs, the roll angle φ, and the roll moment M$_{xFy}$ may be different from one another. In these cases, vibration damping performance slightly decreases as compared to the case of the embodiments; however, the roll vibrations of the vehicle body 16 are damped without the need to detect the roll angle φ1 of the unsprung mass.

In the above-described embodiments, the same low-pass filter is applied to the roll angular acceleration φs$^2$, roll angular velocity φs, roll angle φ, and roll moment M$_{xF}$ of the vehicle body 16. Instead, low-pass filters that are respectively applied to the roll angular acceleration φs$^2$, roll angular velocity φs, roll angle φ, and roll moment M$_{xFy}$ of the vehicle body 16 may be different from each other. In this case, vibration damping performance slightly decreases as compared to the case of the embodiments; however, the roll vibrations of the vehicle body 16 are damped without the need to detect the roll angle φ1 of the unsprung mass.

At least two of the above-described embodiments may be implemented in combination. For example, as in the case of a combination of the front wheel active steering system 70 and the rear active stabilizer 38, the roll vibrations of the vehicle body 16 may be damped with a combination of the actuators of at least two of the above-described embodiments.

What is claimed is:

1. An electronic control unit comprising circuitry configured to:

compute a sum of a product of a roll moment of inertia of a vehicle and a roll angular acceleration of a vehicle body, which is detected by a roll angular acceleration detector, a product of a roll damping coefficient of the vehicle and a first-order integral of the roll angular acceleration, and a product of an equivalent roll stiffness of the vehicle and a second-order integral of the roll angular acceleration, as a controlled roll moment to be applied to the vehicle body, compute a roll moment around a center of gravity of a sprung mass as a correction roll moment, the roll moment being generated by lateral force on wheels due to roll motion, compute a target roll moment based on a value obtained by correcting the controlled roll moment with the correction roll moment, and control an actuator such that a roll moment to be applied to the vehicle body, which is generated by the actuator, becomes the target roll moment, wherein:

the correction roll moment is calculated as a value obtained by processing a product of a mass of the sprung mass, a square of a roll arm length, and the roll angular acceleration of the sprung mass with a first-order lag filter, the roll arm length is a difference in level between a roll center of the sprung mass and the center of gravity of the sprung mass, and a time constant of the first-order lag filter is a value obtained by dividing a vehicle speed by a product of a normalized cornering power of the wheels and a gravitational acceleration.

2. The electronic control unit according to claim 1, wherein the circuitry is configured to compute the correction roll moment based on a vehicle speed.

3. The electronic control unit according to claim 1, wherein the circuitry is configured to apply the same high-pass filter to the roll angular acceleration of the vehicle body, the first-order integral, the second-order integral, and the correction roll moment the same number of times at least twice.

4. The electronic control unit according to claim 1, wherein the circuitry is configured to apply the same low-pass filter to the roll angular acceleration, the first-order integral, the second-order integral, and the correction roll moment.

5. A target roll moment computing method executed by an electronic control unit, the electronic control unit being configured to control an actuator such that a roll moment to be applied to a vehicle body, which is generated by the actuator, becomes a target roll moment, the target roll moment computing method comprising:

computing, by the electronic control unit, a sum of a product of a roll moment of inertia of a vehicle and a roll angular acceleration of the vehicle body, which is detected by a roll angular acceleration detector, a product of a roll damping coefficient of the vehicle and a first-order integral of the roll angular acceleration, and a product of an equivalent roll stiffness of the vehicle and a second-order integral of the roll angular acceleration, as a controlled roll moment to be applied to the vehicle body;

computing, by the electronic control unit, a roll moment around a center of gravity of a sprung mass as a correction roll moment, the roll moment being generated by lateral force on wheels due to roll motion; and computing, by the electronic control unit, the target roll moment based on a value obtained by correcting the controlled roll moment with the correction roll moment, wherein:

the correction roll moment is calculated as a value obtained by processing a product of a mass of the sprung mass, a square of a roll arm length, and the roll angular acceleration of the sprung mass with a first-order lag filter, the roll arm length is a difference in level between a roll center of the sprung mass and the center of gravity of the sprung mass, and a time constant of the first-order lag filter is a value obtained by dividing a vehicle speed by a product of a normalized cornering power of the wheels and a gravitational acceleration.

6. The target roll moment computing method according to claim 5, wherein the correction roll moment is computed by the electronic control unit based on a vehicle speed.

7. The target roll moment computing method according to claim 5, wherein the same high-pass filter is applied by the electronic control unit to the roll angular acceleration of the vehicle body, the first-order integral, the second-order integral, and the correction roll moment the same number of times at least twice.

8. The target roll moment computing method according to claim 5, wherein the same low-pass filter is applied by the electronic control unit to the roll angular acceleration of the vehicle body, the first-order integral, the second-order integral, and the correction roll moment.

9. A non-transitory computer-readable storage medium storing a target roll moment computing method, when executed, causing an electronic control unit to:

compute a sum of a product of a roll moment of inertia of a vehicle and a roll angular acceleration of a vehicle body, which is detected by a roll angular acceleration detector, a product of a roll damping coefficient of the vehicle and a first-order integral of the roll angular acceleration, and a product of an equivalent roll stiffness of the vehicle and a second-order integral of the roll angular acceleration, as a controlled roll moment to be applied to the vehicle body;

compute a roll moment around a center of gravity of a sprung mass as a correction roll moment, the roll moment being generated by lateral force on wheels due to roll motion;

compute a target roll moment based on a value obtained by correcting the controlled roll moment with the correction roll moment; and control an actuator such that a roll moment to be applied to the vehicle body, which is generated by the actuator, becomes the target roll moment to the vehicle body, wherein:

the correction roll moment is calculated as a value obtained by processing a product of a mass of the sprung mass, a square of a roll arm length, and the roll angular acceleration of the sprung mass with a first-order lag filter, the roll arm length is a difference in level between a roll center of the sprung mass and the center of gravity of the sprung mass, and a time constant of the first-order lag filter is a value obtained by dividing a vehicle speed by a product of a normalized cornering power of the wheels and a gravitational acceleration.

10. The non-transitory computer-readable storage medium according to claim 9, wherein the correction roll moment is computed by the electronic control unit based on a vehicle speed.

11. The non-transitory computer-readable storage medium according to claim 9, wherein the same high-pass filter is applied by the electronic control unit to the roll angular acceleration of the vehicle body, the first-order integral, the second-order integral, and the correction roll moment the same number of times at least twice.

12. The non-transitory computer-readable storage medium according to claim 9, wherein the same low-pass filter is applied by the electronic control unit to the roll angular acceleration of the vehicle body, the first-order integral, the second-order integral, and the correction roll moment.

* * * * *